(12) United States Patent
Greene

(10) Patent No.: US 6,631,419 B1
(45) Date of Patent: Oct. 7, 2003

(54) METHOD AND APPARATUS FOR HIGH-SPEED LONGEST PREFIX AND MASKED PREFIX TABLE SEARCH

(75) Inventor: Spencer Greene, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 09/401,475

(22) Filed: Sep. 22, 1999

(51) Int. Cl.[7] .............................................. H04L 12/56

(52) U.S. Cl. ...................... 709/238; 709/245; 709/242; 710/108; 370/392

(58) Field of Search ................................. 709/245, 247, 709/238–239, 242; 370/412, 414, 468, 469, 389, 401, 428, 392, 378, 474, 475; 711/220, 212, 211, 209, 203, 202, 200, 108, 6, 1; 710/9, 4, 3; 707/101

(56) References Cited

U.S. PATENT DOCUMENTS

| | | | |
|---|---|---|---|
| 5,813,001 A | | 9/1998 | Bennett |
| 5,917,821 A | * | 6/1999 | Gobuyan et al. ............ 370/392 |
| 6,052,683 A | * | 4/2000 | Irwin .............................. 707/8 |
| 6,212,184 B1 | * | 4/2001 | Venkatachary et al. ...... 370/392 |
| 6,240,418 B1 | * | 5/2001 | Shadmon ..................... 707/100 |
| 6,252,876 B1 | * | 6/2001 | Brueckheimer et al. ..... 370/394 |
| 6,266,706 B1 | * | 7/2001 | Brodnik et al. .............. 709/242 |
| 6,370,613 B1 | * | 4/2002 | Diede et al. ................. 711/108 |
| 6,434,144 B1 | * | 8/2002 | Romanov .................... 370/392 |
| 6,529,508 B1 | * | 3/2003 | Li et al. ....................... 370/392 |

OTHER PUBLICATIONS

CHiueh et al., "High-Performance IP Routing Table Lookup Using CPU Caching", IEEE INFOCOM 1999, pp. 1421–1428.*

Moestedt et al., "IP Address Lookup in Hardware for High–Speed Routing", Proc. Of Hot Interconnects VI, 1998.*

Morrison, Donald R., "Patricia—Practical Algorithm To Retrieve Information Coded in Alphanumeric," *Journal of the ACM*, vol. 15, No. 4, Oct. 1968, pp. 514–534.

Gonnet et al. *Handbook of Algorithms and Data Structures*, 1991 (First Edition 1984), Addison–Wesley Publishers Ltd., pp. 133–144.

McAuley et al., "Fast routing table lookup using CAMS," *Proceedings IEEE INFOCOM '93*, pp. 1382–1391.

Lampson et al., "IP Lookups using Multiway and Multicolumn Search," *Proceedings of IEEE INFOCOM '98*, pp. 1248–1256.

Gupta et al., "Routing Lookups in Hardware at Memory Access Speeds." *Proceedings of IEEE INFOCOM '98*, pp. 1241–1247.

Moestedt et al., "IP Address Lookup in Hardware for High–Speed Routing," *Proceedings of Hot Interconnects VI*, 1998.

(List continued on next page.)

*Primary Examiner*—Zarni Maung
*Assistant Examiner*—Wen-Tai Lin
(74) *Attorney, Agent, or Firm*—Harrity & Snyder, LLP

(57) ABSTRACT

According to one embodiment (100) a system may receive a multi-bit input value (DEST_IP) and split it into a number of portions (L1bits, L2bits and L3bits). A first portion (L1bits) can generate a first address (A1) that accesses a first array (116). A first array (116) can provide output values or second array pointer values. Second array pointer values may be combined with a second portion (L2bits) to generate a second address (A2). A second address (A2) can access a second array (118). A second array (118) can provide output values or third array pointer values. Third array pointer values may be combined with a third portion (L3bits) to generate a third address (A3). A third address (A3) can access a third array (120) which can provide output values.

7 Claims, 12 Drawing Sheets

OTHER PUBLICATIONS

Nilsson et al., "Fast Address Lookup for Internet Routers." *Broadband Communications: The future of telecommunications* (Eds. P. Kühn and R. Ulrich), Chapman and Hall, 1998, pp. 11–22.

McKewon, Nick, "An Overview of Hardware Issues for IP and ATM." Talk given at Washington University in St. Louis workshop, Nov. 1996. Available at tiny–tera.stanford.edu/~nickm/talks/IP_ATM_WUSTL_Nov96.pdf.

Kawasaki LSI. KE5BLME008, Longest Match Engine product brief. Available at www.klsi.com/products/lme-.html.

Chandranmenon et al., "Trading Packet Headers for Packet Processing." *Proceeding of ACM SIGCOMM '95*, pp. 141–152.

Torrent Networking Tecnnologies, "High–Speed Routing Table Search Algorithms." Available at http://www.torrent-net.com/general/download/highspeed.pdf.

Waldvogel et al., "Scalable high speed IP routing lookups." *ACM Computer Communication Review*, V27, #4, Oct. 1997, pp. 25–36.

Chiueh et al., "High Performance IP Routing Table Lookup using CPU Caching," *Proceedings of IEEE INFOCOM '99*, pp. 1421–1428.

Doeringer et al., "Routing on Longest–Matching Prefixes," *IEEE/ACM Transactions on Networking v4 #1*, Feb. 1996, pp. 86–97.

Degermark et al., "Small Forwarding Tables for Fast Routing Lookups," ACM Computer Communication Review v27 #4, Oct. 1997, pp. 3–14.

\* cited by examiner

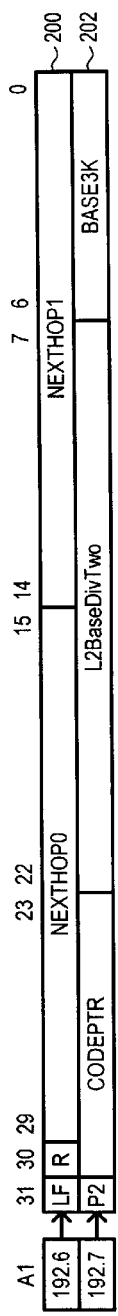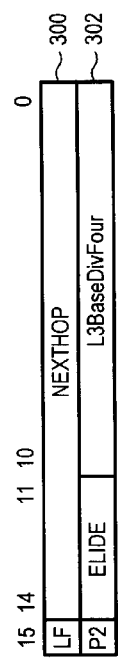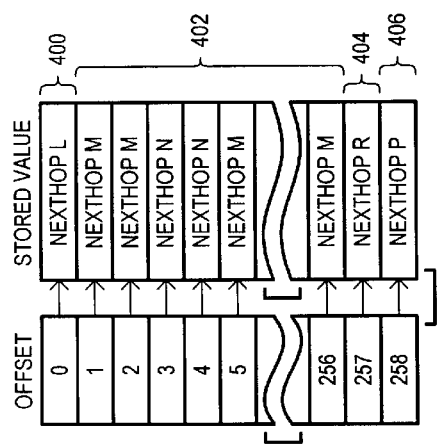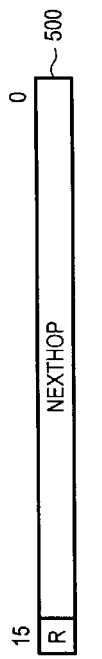

```
1  m1=M1[L1bits]
2  if (m1 encodes nexthop directly) output nexthop
3  else generate A2 as function of m1 and L2bits
4     m2=M2(A2)
5     if (m2 encodes nexthop directly) output nexthop
6     else generate A3 as function of m2 and L3bits
7        m3=M3[A3]
8        output m3 as nexthop
```

FIG. 6

```
1   m1=M1[L1bits]
2   if (m1.nhflag=LF) then
3      if      (target address bit [15]=0) output m1.nexthop0
4      else if (target address bit [15]=1) output m1.nexthop1
5   else
6      m0code=M0[m1.codeptr]
7      L2bits_a=(L2bits>>1)  // narrow it down to two L2 entries
8      L2bits_b=(L2bits&1)   // low order bit selects one of these
9      L2Off_a=(# of 1 bits within leftmost L2bits_a bits of m0code)-1
10     L2Offset=(L2off_a<<1)+L2bits_b
11     A2=(m1.L2Base<<1)+L2Offset
12     Do level-2 lookup using A2
```

FIG. 8

```
1   m2=M2[A2]
2   if (m2.nhflag=LF) then output m2.nexthop
3   else
4      L3bits_a=target IP address bits [9:8]
5      L3bits_b=target IP address bits [7:0]
6      L3Offset=0
7      for i=0 to L3bits_a-1
8         if elide[i] L3Offset+=256 else L3Offset+=1
9      if elide[L3bits_a]  L3Of fset+=L3bits_b
10     A3=(m1.Base3K<<10)+(m2.L3base<<2)+L3Offset
11     m3=m3[A3]
12        output m3.nexthop
```

FIG. 10

```
1   m1=M1[L1bits]
2   if (m1.nhflag=LF) then
3       if       (target address bit [15:14]=00) output m1.nexthop0
4       else if (target address bit [15:14]=01) output m1.nexthop1
5       else if (target address bit [15:14]=10) output m1.nexthop2
6       else if (target address bit [15:14]=11) output m1.nexthop3
7   else
8       L2bits_a=(L2bits>>1)  // narrow it down to two L2 entries
9       L2bits_b=(L2bits&1)   // low order bit selects one of these
10      L2Off_a=(# of 1 bits within leftmost L2bits_a bits of m1.code)-1
11      A2=m1.L2Base+L2Off_a  // dword address
12      Do level-2 lookup using A2
```

FIG. 13

```
1   m2=M2[A2]
2   if (m2.nhflag=LF) then
3       if       (L2bits_b=0) output m2.nexthop0
4       else if (L2bits_b=1) output m2.nexthop1
5   else
6       L3bits_a=target IP address bit [10:7]
7       /* note that hi bit of L3bits_a is same as L2bits_b */
8       L3bits_b=target IP address bits [6:0]
9       L3Offset=0
10      for i=0 to L3bits_a-1
11          if elide[i] L3Offset+=128 else L3Offset+=1]
12      if elide[L3bits_a] L3Offset+=L3bits_b
13      A3=(m2.L3base<<2)+L3Offset
14      m3=M3[A3]
15      output m3.nexthop
```

FIG. 14

```
1   Initialize all M1 entries to the default route
2   For each rule (prefixlength, ipaddr, mask, nexthop)
3      Ipaddr &= ~mask; // make sure don't care bits in ipaddr are  zero
4      L1bits = ipaddr[31:16]
5      L2bits = ipaddr[15:10]
6      L3bits = ipaddr[9:0]
7      If prefixlength<=16
8          For (j1=0; j1<2^(16-prefixlength); j1++)
9              StoreInM1(ipaddr | (j1<<16), mask, nexthop,0b11)
10     If prefixlength==17
11         If (ipaddr[15]==0) StoreInM1(ipaddr, mask, nexthop, 0b10)
12         If (ipaddr[15]==1) StoreInM1(ipaddr, mask, nexthop, 0b01)
13     If prefixlength>17
14         StoreInM2(prefixlength, ipaddr | j2, mask, nexthop)
15     End if
16  End for 17  Sub StoreInM1(adr, mask, nexthop, whichhop)
18     For j2 = all possible values of "gap" bits in mask[31:16]  // if no gap bits, j2=0 only
19         If (whichhop & 0b10) M1[adr | j2].nh0 = nexthop
20         If (whichhop & 0b01) M1[adr | j2].nh1 = nexthop
21     End for
22  End Sub 23  Sub StoreInM2(prefixlength, adr, mask, nexthop)
24     Is there already a chunk allocated for this adr[31:16]?
25     If not, create one and put a pointer to it in all M1[adr[31:16]|j2],
26        where j2=all values of "gap" bits in mask[31:16]
27     For k2 = all possible values of "gap" bits in mask[15:10]
28         Is there already an M2 entry in this L2chunk for (L2bits | k2)?
29         If not, create one and update code32
30         If prefixlength <=22
31             For k1=0 to 2^(prefixlength-22)
32                 M2[adr | k2 | k1] = nexthop
33             End for
34         If prefixlength > 22
35             StoreInM3(prefixlength, ipaddr, mask, nexthop)
36     End for
37  End Sub 38  Sub StoreInM3(prefixlength, adr, mask, nexthop)
39     Is there already a chunk allocated for this ipaddr[31:10]?
40     If not, create on and put a pointer to it in the associated L2chunk at adr[15:10] | k2,
41        Where k2=all values of "gap" bits in mask[15:10]
42     Also point M1[L1bits|j2] to it, for j2=all values of "gap" in mask[31:16], to sort L3chunks
43     For p = all possible values of "gap" bits in mask[9:0]
44         M3[adr | p] = nexthop
45     End for
46  End sub
```

FIG. 18A

```
1   sort L3Chunks in order of the M1 entry they belong to
2   initialize L3base=0
3   for each L3Chunk
4      store L3base in appropriate M2 entry of L2Chunk and into M1
5      for each of the four /24s in this L3Chunk
6         if not subdivided, elide bit=0 and write out one M3 entry
7         if subdivided, elide bit=1 and write out 256 M3 entries
8         add 1 or 256 to L3base
9      end for
10     pad with NULL M3 entries until L3base is a multiple of 4
11     store elide code under appropriate M2 entry in L2Chunk
12  end for
13  initialize L2base=0
14  for each L2Chunk
15     store L2base>>1 into appropriate M1 entry
16     store code32 into appropriate M1 entry
17     for each '1' bit in code32
18        write out two M2 entries
19        add 2 to L2base
20     end for
21  end for
```

FIG. 18B

```
1   for each L2Chunk
2       Extract rawcode from this L2Chunk
3       if extract matching code is in dictionary entry i
4           add 1 to count for dictionary entry i
5           update costs array for all mergers (i,*) and (*,i)
6           next L2Chunk
7       else
8           add rawcodes to dictionary
9           if size of dictionary > target size
10              find lowest-cost i,j pair to merge from costs array
11              merge i,j freeing up slot i in dictionary
12              update costs array for (j,*) and (*,j)
13              delete costs (i,*) and (*,i) from costs array
14  end for
```

FIG. 19

```
1   for (all the M1 entries affected by this rule change)
2       if (this M1 entry is a Leaf before and after the change)
3           update nexthop0 and/or nexthop1 in this M1 entry
4       else if (this M1 entry changes from P2 to LF)
5           make this M1 entry a Leaf with appropriate nexthop info
6           tag the old L2Chunk and any L3Chunks for deletion
7       else (this M1 entry is a P2 before and after the change)
8           build a new L2Chunk for this M1 entry from scratch
9           build all associated L3Chunks from scratch
10          store the L3Chunks into free memory after the last M3 entry
11          store the L2Chunk into free memory after the last M2 entry
12          update this M1 entry to point to the new L2Chunk & Base3K
13          tag the old L2Chunk and any L3Chunks for deletion
14  end for
15  apply update to shadow trie
```

FIG. 20

```
1   while (there is memory in M2 or M3 to be reclaimed)
2      examine the first L2Chunk above M2_free_top
3      if tagged for deletion, annex it by increasing M2_free_top
4      else if tagged for later rebuild
5         rebuild associated L3Chunks and store at M3_free_bottom
6         rebuild this L2Chunk and store at M2_free_bottom
7         point M1 entry at new L2base and Base3K
8         tag old L3Chunks for deletion
9         annex old L2Chunk by increasing M2_free_top
10     else if (there is memory elsewhere in M2 to be reclaimed)
11        copy this L2Chunk to M2_free_bottom
12        point M1 entry at new L2base (Base3K stays the same)
13        annex old L2Chunk by increasing M2_free_top
14     end if
15     examine the first L3Chunk above M3_free_top
16     if tagged for deletion, annex it by increasing M3_free_top
17     else if (there is memory elsewhere in M3 to be reclaimed)
18        copy this L3Chunk to M3_free_bottom
19        point M2 entry at new L3base
20        annex old L3Chunk by increasing M3_free_top
21     end if
22   end while
```

FIG. 22

METHOD AND APPARATUS FOR HIGH-SPEED LONGEST PREFIX AND MASKED PREFIX TABLE SEARCH

TECHNICAL FIELD

The present invention relates generally to data communications, and more particularly to systems and methods of routing or monitoring network data according to routing rules.

BACKGROUND OF THE INVENTION

In connectionless networks like the Internet, each router along the packet path from a source must make an independent decision on how to forward a packet closer to its destination. Each such router and switch must also make an independent decision on how to allocate its resources (buffer memory, fabric capacity, link bandwidth, etc.) when faced with competition among packets for these resources. A system makes this decision by examining the initial portion ("header") of the packet, and from fields contained within the header, determining the appropriate local action for the packet.

The speed (i.e., data throughput) of a router can be limited by one of many factors. A first factor is the data interface of the device. The data interface is that portion of the device that is connected to the data transmitting media. Presently, with fiber optic and other technologies, data transfer rates of 10 gigabits per second (Gbits/s) and greater can be achieved. A second factor is the "switch matrix" within a router. The switch matrix enables the physical data path between the interfaces of a device, and typically includes a number of integrated circuits (chips) connected by one or more buses. Advances in scheduling algorithms (to determine priority and timing of data paths) as well as improvements in interconnect technology (both chip-to-chip and on-chip) currently allow for transfer rates of hundreds of Gbits/s. However, this high data transfer rate given for a switch matrix assumes that router has already determined the correct output port for the data packet. This leads to a third, and arguably the most difficult factor involved in scaling up router throughput: the lookup engine.

The lookup engine searches a table of "rules" which define sets of possible values for the various header fields of interest. (What we call a "rule" is also known variously as a route (when it specifies destination-prefix only), filter (in a firewall environment), traffic class, aggregation rule, etc.). These rules are derived from routing protocols, manual configuration, or other means. While a single rule may specify an exact packet header, more typically it specifies a range of values. The lookup engine searches the table, using the packet header information as a search key. The result of the search ("associated data") tells the system where and how to forward the packet.

Were destination addresses all uniform, the lookup operation would require a simple "exact-match" search, for which there are many well-known approaches. Unfortunately, this is not the case. Some protocols, such as the Internet protocol (IP), require "longest prefix matching" or "masked prefix matching" lookup operations.

The problem of longest prefix matching may be best understood by example. Accordingly a two rule example for a 32-bit address is given below. Addresses are written by separating "octets" (8-bit data sections) by periods. Thus, the addresses 192.9.0.0 is equal to (11000000 00001001 00000000 00000000). The two routing rules are

| 192.9/16 | → Next hop "A" |
| 192.9.4.0/26 | → Next hop "B." |

The first rule requires that the first 16-bits of the 32-bit search key be examined, and if they are equal to 192.9, the packet will be forwarded to a next hop (port or interface) identified as A. However, within the same address range is a subset of the search key that includes the same first 16-bits as the first rule, but further includes ten more bits for comparison. Thus, the second rule requires that the first 26-bits of the search key to be examined. If the first 26-bits is equal to 192.9.4.0, the packet will be forwarded to the next hop identified as B. IP and IPX routing, as well as other applications, require that the longest prefix match (26-bit in the example) take precedence over a shorter prefix match (16-bit in the example). Thus, a longest prefix matching capability is a necessary function for these router applications.

The masked-prefix matching problem is a generalization of longest-prefix matching. In longest-prefix matching, each rule "examines" a contiguous set of bits in the search key, starting from the most-significant bit. The 192.9/16 rule above, for example, examines the high 16 bits of the search key and tests against the value 192.9. In masked prefix matching, each rule examines a subset of the bits in the search key, but the subset does not have to be contiguous, nor does it have to begin at the most-significant bit. For example, a masked-prefix rule may take the form 192.9.x.0/26→Next hop "C"

which would examine the first 16-bits, ignore the next 8-bits, and examine and the next 2-bits of the search key. A match is successful only if the first 16-bits are equal to 192.9 and the $25^{th}$ and $26^{th}$ bits are equal to 00. Any don't-care bits within the prefix we call "gaps" in the prefix. An ordinary longest-prefix match does not permit gaps. Note that although the above example shows a gap of exactly 8 bits and aligned on an 8-bit boundary, in a masked-prefix rule gaps or don't care bits may appear in any bit position(s) within the prefix.

A number of approaches have arisen to address the longest prefix matching problem; some work, though much less, has been done on masked prefix matching. A common technique, because of the complexity of longest prefix and masked prefix searches, involves caching the results of recent complex lookup operations in an exact-match search table, such as a binary content addressable memory (CAM) or a hash table. If a packet header arrives that exactly matches one of the cached lookup operations, there is a cache hit, and the complex lookup operation for that particular destination address is avoided. Such an approach can be useful where the number of different addresses handled by the router is limited. However, in the event the router must handle a large number of addresses, the use of cached longest prefix match results is not practical. Further, this approach exhibits "traffic dependency": its performance is dependent on the assumption that the router will need to look up the a small number of unique packet header values over and over again, which is not true for many traffic patterns. Finally, although caching can reduce the load on the longest prefix matching or masked prefix matching system, it still relies on an underlying complex search for any header which is not found in the cache, so the problem of fast hardware searching is still present.

A second technique that relies on specialized hardware involves the use of specialized memory circuits. Such memories are typically variations on standard CAMs, and include internal circuitry capable of performing a longest prefix match operation or other masked searches. Such specialized CAMs have drawbacks, however, in that they can be more expensive than commodity memory devices, consume more power, and are limited in their density. In addition, because of specialized semiconductor process requirements, such CAM variations can be difficult to integrate with logic circuits, in the event the CAM variation is to be "embedded" to form a single integrated circuit.

Other prior art approaches in the literature include "software-oriented" and "hardware-oriented" search algorithms.

Software-oriented algorithms are designed to run on conventional computer system platforms. "Patricia—a practical algorithm to retrieve information coded in alphanumeric" *Journal of the ACM*, v15, #4, October 1968, pp. 515–534, by Morrison, discloses an algorithm (named "Patricia") that is utilized by many routers, in one variation or another, for performing the lookup function. A drawback to the Patricia algorithm is the number of memory accesses that are required for the system running the algorithm. In a worst-case lookup, 32 memory accesses are required. For the average lookup case, between five and ten memory accesses are required. Large numbers of memory accesses can add considerable time to the routing function, and are therefore undesirable.

More recent software algorithms have been developed that provide improvements over the Patricia algorithm. Four such algorithms are disclosed in "Small Forwarding Tables for Fast Routing Lookups," *Proceedings of the 1997 ACM SIGCOMM Conference*, Cannes, France, 1997 by Brodnick et al., "Routing on Longest-Matching Prefixes," *IEEE/ACM Transactions on Networking*, v4, #1, February 1996, pp. 86–97 by Doeringer et al. (and the related U.S. Pat. No. 5,787,430: "Variable length data sequence backtracking a trie structure"), "IP Lookups using Multiway and Multicolumn Search," IEEE INFOCOM '98 Proceedings v3 pp. 1248–1256 by Lampson et al., and "Scalable high speed IP routing lookups," *Proceedings of the 1997 ACM SIGCOMM Conference*, Cannes, France, 1997, by Waldvogel et al. These algorithms are optimized for software implementation with general purpose processors, and rely on the pre-processing of routing tables to reduce the number of memory accesses required for each lookup operation. As a result, these more recent algorithms are useful in traditional software based routers, in which a central processing unit (CPU) examines and forwards each packet that is received. However, faster routers utilize application specific integrated circuits (ASICs) that are custom designed to perform the forwarding function, and leave only routing table updates and error processing to a general purpose CPU. While the above-referenced algorithms can be implemented in hardware, they are not well suited for such an approach, as they rely on capabilities specific to general purpose CPUs, such as complex CPU caches.

Algorithms optimized for implementation in hardware have been developed. One such algorithm is disclosed in "Routing Lookups in Hardware at Memory Access Speeds," IEEE INFOCOM '98 Proceedings v3 pp. 1240–1247 by Gupta et al. Gupta et al. relies on a large memory size of 56 to 264 megabits, and has poor table-update performance. It also works best with tables of short prefixes; performance is worse when many prefixes in the table are long. In addition to the limitations above, neither the software-oriented nor the hardware-oriented algorithms referenced above can handle masked-prefix searches.

Due to the cost and time required to execute longest prefix match operations, it would be desirable to find some way of performing a longest prefix matching operation that does not require a large number of memory accesses. Such a solution would provide a significant improvement in lookup engine operations, and thereby improve the overall data throughput of a router or bridge.

It would also be desirable to have an method for longest prefix match operations that provides advantages over prior art methods, but can still be efficiently implemented into hardware. Such a method could then be advantageously used in current high-speed router architectures that do not use a general purpose processor for the lookup function.

It is also desirable to arrive at a high-speed solution to the longest prefix matching problem that utilizes as small a memory structure size as possible. In addition, because embedded memory circuits (such as DRAMs or SRAMS) can result in very high speed memory accesses, it would also be desirable to arrive at a fast solution to the largest prefix lookup problem, that is also amenable to being implemented in an integrated circuit having embedded memory.

In addition to performance, size and implementation concerns, another important aspect of a lookup operation is the time required to update a data structure containing the routing rules. In prior art approaches, table updates can require long "stalls" (interruptions in routing lookups) when the updated data structure is written to the lookup engine memory. One way to limit stalls is to utilize a "double buffered" system. A double buffered system maintains two copies of a data structure, one used for lookups, the other for updates. Periodically, the functions of the two copies are switched. Such an approach obviously doubles the amount of memory necessary for the lookup table. It also requires significant additional memory bandwidth, with attendant complexity and chip pin count, in order to write one copy without interrupting the reads of the other table.

It would be desirable to provide a longest prefix matching approach that allows for rapid updates to the data structure used by a lookup engine, and yet does not unduly increase the overall system memory size, or complexity of the lookup engine memory interface.

Finally, it would be desirable to provide a lookup engine that can support both longest prefix matching and masked prefix matching, without the high cost and high power consumption of CAM memories.

SUMMARY OF THE INVENTION

According to a first embodiment, a lookup engine receives a search key, and after identifying the best matching prefix or masked-prefix rule for the search key, provides an output value. The first embodiment may include three independent memory arrays that may be accessed in a pipelined fashion, allowing one search operation to be completed on each operational cycle. A first 16-bit portion of a search key may be applied to a first array, which may provide an output value when only prefixes less than or equal to 16-bits are in the possible result set, or a pointer value to a second array, when prefixes greater than 16-bits are in the possible result set. A second 6-bit portion the search key may be applied to the second array, which may provide an output value when only prefixes less than or equal to 22-bits are in the possible result set, or a pointer value to a third array for when prefixes greater than 22-bits are in the possible result set. A third 10-bit portion of the search key may be applied to the third array, which may provide an output value when prefixes greater than 22-bits are in the possible result set.

The data structure stored within the first, second and third arrays, has a novel compact structure, allowing conventional memory devices to be used as storage elements. Alternate embodiments, optimized for implementation in software and a corresponding data structure are also disclosed, along with approaches to updating the data structure and to managing the memory that stores the array values.

According to one aspect of the embodiments, the values within the second and third arrays are arranged in compact "chunks," each of which may include a number of entries. The layout of each chunks within the second array may be summarized by a code value contained in the corresponding first array pointer entries, allowing for compact second array pointer entries. Similarly, the layout of each chunk within the third array may be summarized by a code value contained in the second array pointer entries, allowing for compact third array pointer entries.

According to another aspect of the first embodiment, pointer values to the second array include reduced bit length code pointer values. Code pointer values may be applied to a code dictionary which provides a longer bit length code value. The code value may summarize the arrangement of second array chunks.

According to another aspect of the first embodiment, code values are merged within the code table to create a more compact code table.

According to another aspect of the first embodiment, entries within the third array are accessed by information contained in pointer values within both the first array and second array.

According to another aspect of the first embodiment, the second array includes a number of sub-arrays. Within each sub-array addresses may be indexed by the second portion of the destination address, and which sub-array to enable is selected according to bits in the first portion of the destination address.

According to one aspect of the embodiments, updates to the compact data structure can be accomplished with minimal interruptions to the routing functions.

An advantage of the embodiments is that throughput of one lookup operation per memory access may be accomplished, providing speed advantages over the cited prior art approaches.

Another advantage of embodiments is that they may provide small data structures to accomplish the rapid lookup function, and thus can utilize inexpensive static random access memories (SRAMs), dynamic random access memories (DRAMs), or embedded memories An advantage of one embodiment is that it may provides a single high-speed lookup solution to the longest prefix matching problem, and so may be used to provide a single replacement for those routers that include both a "fast path" and "slow path."

An advantage of the first embodiment is that it may be optimized for implementation into hardware and can be easily integrated with other logic.

Another advantage of the first embodiment is that is may provide rapid masked prefix matching operations.

BRIEF DESCRIPTION OF THE DRAWINGS

FIG. 2 is a diagram of first array entries according to the first embodiment.

FIG. 3 is a diagram of second array entries according to the first embodiment.

FIG. 4 is a diagram of a third array "chunk" according to the first embodiment.

FIG. 5 is a diagram of a third array entries according to the first embodiment.

FIG. 6 is a method describing the first embodiment.

FIG. 8 is a method describing a second address generator.

FIG. 10 is a method describing a third address generator.

FIG. 13 is a method describing first level lookup functions according to the second embodiment.

FIG. 14 is a method describing second and third level lookup functions according to the second embodiment.

FIGS. 18A and 18B are methods illustrating data structure compilation functions according to a preferred embodiment.

FIG. 19 is a method illustrating code merging functions according to a preferred embodiment.

FIG. 20 is a method illustrating data structure update functions according to a preferred embodiment.

FIG. 22 is a method illustrating memory management functions according to a preferred embodiment.

DETAILED DESCRIPTION OF THE EMBODIMENTS

The present invention will described as a series of embodiments described in conjunction with tables and figures. Most of the particular embodiments described can perform a lookup operation on a 32-bit input value, which may be an internet protocol (IP) destination address, and provide a corresponding 15-bit output value, which may be a output port (router interface) designator. As will be described, however, longer field and multiple field lookups may also be possible according various alternate embodiments approaches.

Throughout this document the term "first" or "leading" or "leftmost" bits shall mean high-order or most-significant bits, and "last" or "trailing" or "rightmost" shall mean the opposite. For a 32-bit value, the first bit is bit [31], the sixteenth bit is bit [16], the seventeenth bit is bit [15], etc.

General Architecture for First Embodiment

Figure 1:
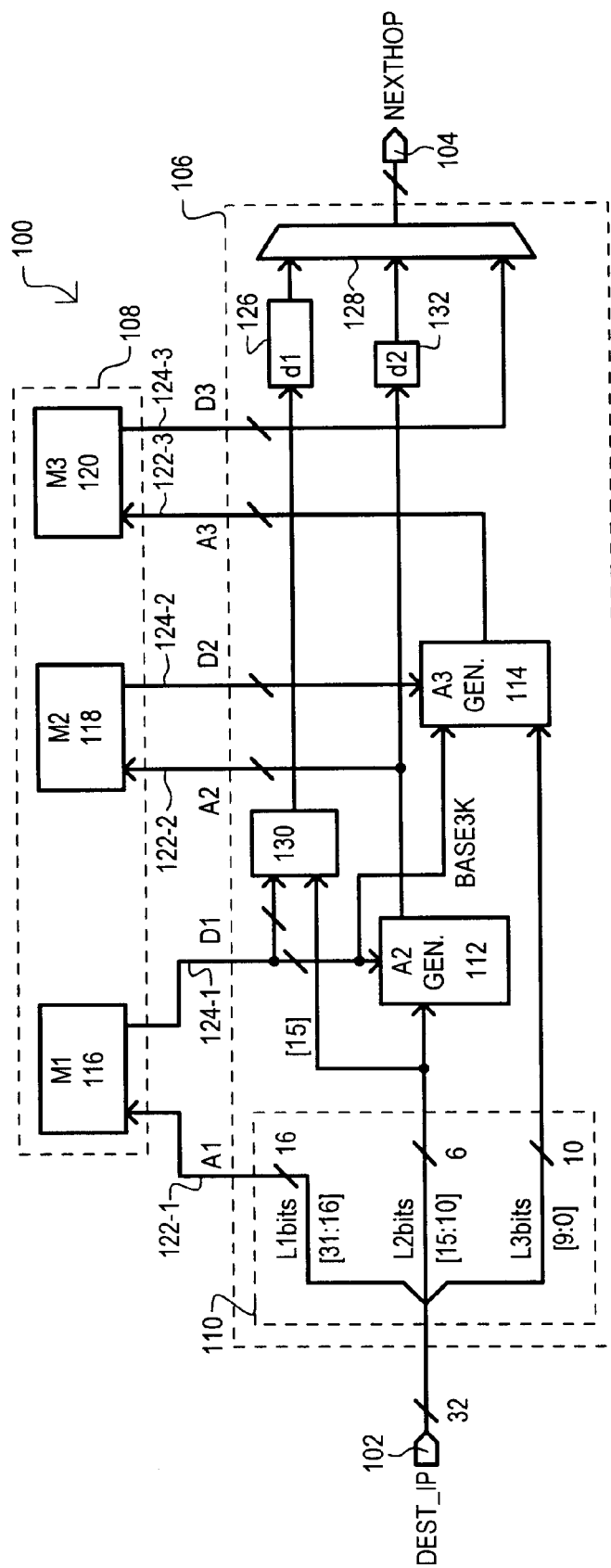
FIG. 1 is a block schematic diagram of a lookup engine according to a first embodiment.

Referring now to FIG. 1, a system according to a first embodiment is set forth in a block schematic diagram and designated by the general reference character 100. The first embodiment 100 can receive a 32-bit destination address (DEST_IP) from a target input 102 in order to search for a best matching prefix or masked-prefix. According to routing rules implemented into a novel data structure, the system 100 can provide a nexthop designator (NEXTHOP) at a match output 104. The system 100 can be conceptualized as including a lookup engine 106 and a memory system 108.

The lookup engine 106 may include an input value splitting section 110, a second address generator 112, and a third address generator 114. The memory system 108 may be logically divided into three memory arrays, including a first array 116, a second array 118, and a third array 120. The lookup engine 106 may be coupled to the various arrays (114, 116, and 118) of the memory system 108 by corresponding independent address buses (122-1 to 122-3) and independent data buses (124-1 to 124-3), respectively. The memory system 108 can be advantageously formed with "conventional" memory devices. As just two examples, static random access memory (SRAM) or dynamic RAM (DRAM) integrated circuits could be utilized.

The value splitting section 110 may receive the DEST_IP input, and split the value into a number of different portions. In the particular arrangement of FIG. 1, the first 16 bits [31:16] of the DEST_IP value can be split off to form an L1bits value, the next 6 bits [15:10] can be split off to form an L2bits value, and the remaining 10 bits [9:0] can be split off to form an L3bits value. The first leading portion of the DEST_IP value (L1bits) may be utilized to generate a first address (A1). The first address can be applied, by way of address bus 122-1, to the first array 116. It is understood that the term "leading" bits is intended to describe those bits that are most significant in the longest prefix matching function, and should not be interpreted to represent a particular order of the bits within a data packet. In the particular arrangement of FIG. 1, when the A1 address is applied to the first array 116, a data value D1 may be output. The D1 value may be either a "directly encoded" value or a second array "pointer" value. A "directly encoded" value can provide one or more valid nexthop values. In the event a directly-encoded value is provided, the correct nexthop value can be selected from among the nexthops presented, by a value selector 130. In the particular arrangement of FIG. 1, the value selector 130 receives two nexthop values, and selects one according to the seventeenth DEST_IP bit (bit [15], the high-order bit of the L2bits value). The selected nexthop, as output from the value selector, may be forwarded to a first delay circuit 126. The first delay circuit 126 can introduce a first predetermined delay into the nexthop value before forwarding the nexthop value to an output circuit 128. The output circuit 128 may then couple the nexthop value as the NEXTHOP output of the lookup engine 106.

In the event the applied address (A1) results in a second array pointer value, the D1 value may be applied to the second address generator 112. In addition, a portion of the D1 value, shown as BASE3K, may be applied to the third address generator 114. The second address generator 112 can use the second array pointer value, in conjunction with the L2bits value, to generate a second address (A2). The A2 address may then be applied to the second array 118.

When applied to the second array 118, the A2 address may produce similar results to the application of the A1 address to the first array 116. The A2 address may generate a data value (D2) that can be either a directly encoded value or a third array pointer value. The directly encoded value may also function as a valid nexthop value, and may be applied to a second delay circuit 132. The second delay circuit 132 can introduce a second predetermined delay, that is less than the first predetermined delay, into the nexthop value from the second array 118, and then forward the value to the output circuit 128. The value may then be provided as the NEXTHOP output. A third array pointer value may be applied to the third address generator 114. The third array pointer value may then be used, in conjunction with the L3bits value and the BASE3K value, to generate a third address (A3).

The third address value may then be applied to the third array 120 to generate a data value (D3) that can directly encode to a valid nexthop value. This value may be applied to the output circuit 128 to generate the NEXTHOP output value.

The first embodiment may rely on a unique data structure stored within the logically independent first, second, and third arrays (116, 118, 120). The arrays (116, 118, 120) can be considered "logically independent" in that they are separately addressed. However, it is understood that the arrays (116, 118, 120) could be physically independent devices (i.e., individual SRAMs or banks within a multibank DRAM integrated circuit, as just two examples), or alternatively, one or all of the arrays (116, 118, 120) could be implemented as regions in a single SRAM or DRAM integrated circuit. The data structure utilized to accomplish the rapid pipelined lookup operation can be subject to some variation according to number of factors, including: available memory system size; type of memory devices utilized; number and clustering of routing rules; and desired compactness of router engine (when the router engine is realized as hardware—such as an application specific integrated circuit (ASIC)).

The first embodiment 100 may achieve advantageously fast lookup speeds because accesses can be "pipelined." As soon as one DEST_IP value has been used to generate an address for the first memory array, a next DEST_IP value can be applied at the target input, so that several queries are being processed simultaneously to hide the latency of the memory devices.

Data Structure for First Embodiment

One example of a unique data structure that may be used in conjunction with the first embodiment architecture will now be described. The data structure allows "chained" accesses from one array to another when complex routing rules require longer prefix matching. In particular, as described above, the first array 116 can store "directly encoded" entries and "second array pointer" entries. The directly encoded entries may represent a "no prefix longer than 17 bits among possible matches" case (only 16 or 17 bits need to be matched), and can provide nexthop output values for such cases. The second array pointer entries may represent a "longer than 17 bits may match" case, involving a longest prefix match or masked prefix match operation that includes prefixes of 17 bits or longer.

The second array 118 may store directly encoded entries that can provide nexthop values for longest prefix matching and masked prefix matching cases where the first 17-bits indicates that some prefixes between 17-bits and 22-bits are in the possible-match set. In addition, the second array 118 may also include "third array pointer" entries for cases where the first 22-bits indicates that some prefixes between 23 and 32 bits are in the possible-match set. The third array 120 may include directly encoded entries that can provide nexthop values for those cases that require a prefix match of 23 bits or longer.

Thus, in a fastest access case, where only the first 16 or 17 bits of the DEST_IP value need to matched, the first array 116 may be accessed and a directly encoded entry value can provide a nexthop output value. In the next fastest access case, where 17 to 22 bits of the DEST_IP value need to be matched, the first array 116 may be accessed and a pointer value can point to a location in the second array 118. The second array 118 may then be accessed and a directly encoded entry value can provide the appropriate nexthop output value. Thus, this second case may require two memory access operations (one to the first array 116 and one to the second array 118). In the worst case (in terms of memory accesses), the first array 116 may be accessed and produce a pointer to the second array 118. The second array may be accessed and produce a pointer to the third array 120. The third array 120 may be accessed and provide the appropriate nexthop output value. Importantly, while the worst case may require three memory accesses, such accesses can be pipelined, to produce valid nexthop values on consecutive operational cycles. This can provide valuable throughput advantages over other prior art approaches.

Referring now to FIG. 2, examples of first array 116 data entries that may form the data structure for the first embodiment are set forth in detail. FIG. 2 illustrates two types of possible entries in the first array 116. The format of the entries set forth in FIG. 2 is optimized for conventional memory device data widths, and so each type of first array entry has a length of 32-bits. The data format types each include a number of data fields, each data field being identified by the bits it occupies within the 32-bit entry.

The two types of first array 116 entries are shown to include a directly encoded ("leaf") entry 200, and a second array pointer (P2) entry 202. Adjacent to each entry (200 and 202) is an exemplary address value (A1). The address values may be 16-bit values, and are represented by two 8-bit ("octet") values separated from one another by a period. The sixteen bit value corresponds to the first 16-bits of the DEST_IP value ([31:16]). Thus, the A1 value 192.6 can correspond to the leaf entry 200, while the A1 value of 192.7 can correspond to the P2 entry 202.

Both entries can include a single bit flag field, that occupies bit "31." This field may signify the entry type. Thus, one logic value (LF) indicates a leaf entry 200 while the other (P2) indicates a P2 entry 202. Bit 30 of the leaf entry 200 may be reserved for other purposes, and so has the field identifier "R." The remaining 30 bits of the leaf entry 200 can include two 15-bit nexthop values (NEXTHOP0 and NEXTHOP1). Depending upon the routing rules associated with corresponding address, the NEXTHOP0 and NEXTHOP1 values may be the same value or different from one another. For example, if the routing rules indicate that all DEST_IP values corresponding to the range 192.6.0.0 to 192.6.255.255 map to the same nexthop value, the NEXTHOP0 and NEXTHOP1 values may be the same.

In the particular embodiment of FIG. 2, the nexthop values (NEXTHOP0 and NEXTHOP1) may be different in the case of one type of routing rule: a 17-bit best matching prefix match case. Referring back to the particular example of FIG. 2, in the event a routing rule indicated that DEST_IP values from 192.6.0.0 to 192.6.127.255 were to be routed to a nexthop X, and DEST_IP values from 192.6.128.0 to 192.6.255.255 were to be routed to a nexthop Y, the NEXTHOP0 value could be X and the NEXTHOP1 value could be Y. When the leaf entry 200 192.6 is accessed, the NEXTHOP0 value may be selected when the seventeenth bit [15] of the DEST_IP value is "0", and the NEXTHOP1 value may be selected when the seventeenth bit [15] is a "1."

In this manner an initial portion of an input destination address can be used to access multiple nexthop values stored at a single first array 116 location, while subsequent portions of the destination address can be used to select one of the multiple nexthop values. This provides for an advantageously compact first array structure.

Referring once again to FIG. 2, the P2 entry 202 is shown to correspond to the initial DEST_IP values of 192.7. This pointer may indicate that a routing rule (or rules) requires examination of more than just the initial 16-bits of the DEST_IP. Furthermore, the rule does not result in a simple 17-bit longest prefix match, as is the case of a leaf entry with different NEXTHOP0 and NEXTHOP1 values. The P2 entry 202 is shown to particularly include, in addition to the flag field (bit 31), an 8-bit code pointer value (CODEPTR) at bit locations 23–30, a sixteen bit second array base address (L2BaseDivTwo) at bit locations 22–7, and a high-level third array base address (BASE3K), at bit locations 6–0.

The use of the P2 entry 202 by a system may be best understood by example. Thus, illustration purposes a set of sample routing rules are provided for the 192.7 leading octet pair:

| 192.7/16 | → Nexthop X |
| 192.7.4/22 | → Nexthop Y. |

These two rules establish three mapping ranges for the 192.7 values. Those address ranges prior to the 192.7.4 value (192.7.0.0 to 192.7.3.255) should be directed to nexthop location X. Those address ranges that have the same leading 22-bit values as 192.7.4 (192.4.0.0 to 192.7.255.255) should be directed to a nexthop location Y. Finally, those address that follow the above 22-bit prefix group (192.8.0.0–192.255.255) should be directed to the nexthop location X. Looked at in another way, a 22-bit longest prefix match may be necessary to ensure that those values whose first 22-bits match 192.7.4 value are directed to nexthop location Y.

The P2 entry 202 may point to a collection of second array 118 entries that provide the nexthop values needed for the various DEST_IP address ranges. For the two rule example set forth above, three entries (nexthop X, nexthop Y, and nexthop X) can be used for the three address ranges.

A collection of second array 118 entries corresponding to a single P2 entry 202 is referred to as a "chunk." Each chunk may include a base address, corresponding to the start of the chunk, and a number of contiguous offset addresses, one for each chunk entry. One second-array chunk may contain, in compressed form, all the prefix and nexthop information associated with one particular 16-bit L1bits value (in the case of prefix matching) or a plurality of 16-bit L1bits values (in the case of masked prefix matching). The number of offset addresses associated with each base address value may depend upon the set of routing rules associated with the 16-bit L1bits value(s) associated with the chunk. Thus, in the simplest case, the two rule example set forth above may result in a three entry chunk: a base address that provides a nexthop X value, a first offset address that provides a nexthop Y value, and a second offset address that provides the nexthop X value. As DEST_IP values in the first range (192.7.0.0 to 192.7.3.255) are received, they can map to the base address plus offset=0 (and hence nexthop X). Similarly, DEST_IP values in the second range (192.4.0.0 to 192.7.255.255) may map to base address plus offset=1 (and hence nexthop Y). Finally, DEST_IP values in third address range (192.8.0.0–192.255.255) may map to the base address plus offset=2 (and hence nexthop X).

While a chunk of three address values presents the simplest arrangement for the sample pair of rules, for more compactness in the bit width of the first array, a chunk could include multiple offset addresses for the same nexthop value. As just one example, referring back to the two rule case (192.7/16→Nexthop X and 192.7.4/22→Nexthop Y), the resulting chunk for the 192.7 value could result in a chunk that includes a base address and five offset addresses:

| | |
|---|---|
| Base Address + offset=0 | Nexthop X |
| offset=1 | Nexthop Y |
| offset=2 | Nexthop X |
| offset=3 | Nexthop X |
| offset=4 | Nexthop X |
| offset=5 | Nexthop X. |

How such multiple entries are utilized will be described at a later point herein.

In the arrangement described by FIGS. 2 and 3, a particular entry within the second array 118 may be accessed according to three criteria: the L2BaseDivTwo value and the CODEPTR value from the corresponding P2 entry 202, and the L2bits value. In particular, the L2BASE value can be a pointer to the chunk base address within the second array 118. In the embodiment of FIG. 2, each second array chunk base address value is a multiple of two, so its low-order bit (always zero) may not be stored; hence the "DivTwo" in L2BaseDivTwo. Once a chunk base address within the second array 118 is established, the CODEPTR value in combination with the L2bits may determine an offset value from the base address. The offset value can be added to the base address to generate the second array address A2 to access the correct entry within a desired chunk.

The present invention envisions a number of different approaches to generating a particular second array address from values set forth in a P2 entry (such as 202) and the corresponding L2bits value. These various methods (in addition to alternate P2 entry formats) will be described in detail at a later point herein.

It is noted that the function of the BASE3K field has not been described. This value may be used for indexing into a third array 120, and so will be described in more detail below.

An example of possible second array entries for use with the first embodiment 100 are set forth in FIG. 3. FIG. 3 illustrates two types of possible entries in the second array 118. Like the entries of FIG. 2, the entries of FIG. 3 may be advantageously optimized to be compatible with conventional memory device data widths. Thus, each entry is shown to be 16-bits wide.

The second array data entry types can be similar to those of the first array, and include a directly encoded ("leaf") entry type 300 and a third array pointer (P3) entry type 302. Furthermore, both entry types may also include a single bit flag field, that occupies bit "15." This field signifies the entry type (LF or P3). The remaining 15 bits of the leaf entry 300 may form a 15-bit nexthop value. The P2 entry 302 of FIG. 3 is shown to include, in addition to the flag bit P3, a 4-bit "elide" code (ELIDE) at bit locations 14–11, and a ten-bit third array base address (L3BaseDivFour) at bit locations 10–0.

One third-array chunk may contain, in compressed form, all the prefix and nexthop information associated with one particular 22-bit (L1bits, L2bits) value (in the case of prefix matching) or a plurality of 22-bit (L1bits, L2bits) values (in the case of masked prefix matching).

In general, accesses to the third array 120 may be performed in a similar fashion to accesses to the second array 118. Information contained in a previous array pointer entry (P3) can be utilized to identify a chunk base address within the third array 120. A portion of the input DEST_IP value (L3bits) can then used to indicate an offset from the chunk base address. The offset, when added to the chunk base address, may access an entry containing the correct nexthop information. In the particular arrangement of FIGS. 2 and 3, third array 120 accesses may differ from second array 118 accesses in that the base address may also be generated from information contained within the first array 116 (the BASE3K value), and the third array 120 may only contain directly encoded values.

In the particular embodiment set forth in FIG. 3, the BASE3K entry of a corresponding P2 pointer entry may be used in combination with the L3BaseDivFour value to point to the base address of a chunk of addresses within the third array 120. In particular, the BASE3K value may function as the leading address bits for a third array 120 base address. This feeding forward of the BASE3K values can make it possible to construct a deeper third array 120, while still maintaining the compact 32-bit second array entry format.

Each third array chunk base address can be a multiple of four, so its low-order two bits (always zero) are not stored; hence the "DivFour" in L3BaseDivFour. Thus, the sum of the BASE3K<<10 value and L3BaseDivFour<<2 value together can point to the base of a chunk.

Within a third-array chunk, the 10-bit L3bits value, formed from DEST_IP[9:0], may be used to compute the offset address. There may be as many as 1024 nexthop entries in the chunk: one entry for every possible value of DEST_IP[9:0]. However according to the present invention the chunk may be stored in compressed form, such that when there is redundancy—meaning that when there are only a few distinct nexthop values among the 1024 possible DEST_IP[9:0] addresses—then fewer than 1024 entries need to be stored. Each third-array chunk may be treated as four address groups. Two address bits DEST_IP[9:8] may selects one of the four address groups. The remaining eight bits of L3bits, DEST_IP[7:0], can identify a specific address within the selected address group.

To provide for a more compact third array 120 data structure, in the particular arrangement of FIG. 3, each group within a chunk can be expressed either as 256 entries ("fully enumerated," indicating that there are at least two different nexthop values among the 256 addresses in the group) or a single entry ("compacted," indicating that all 256 entries within the group map to the same nexthop value). Whether a group within a chunk is fully enumerated or compacted can be indicated by the ELIDE field within the P3 entry 302. The ELIDE field may include four bits, each of which indicates the status of one of the four address groups of its chunk. For example, an ELIDE entry of "0000" could indicate that a chunk included only four nexthop values: one each for the four address groups. An ELIDE entry of "1111" could indicate that a chunk included 1024 addresses, exactly the same as if no compression were used.

The use of the P3 entry 302 by the first embodiment system 100 may be understood by example. Accordingly, a second set of five rules are set forth:

| | |
|---|---|
| 192.7.4/24 | → Nexthop L |
| 192.7.5/24 | → Nexthop M |
| 192.7.5.2/31 | → Nexthop N |
| 192.7.6/24 | → Nexthop R |
| 192.7.7/24 | → Nexthop P. |

This set of rules divides the 32-bit DEST_IP address into six different address ranges. The address ranges and their corresponding nexthop values are summarized below.

| | |
|---|---|
| 192.7.4.0 to 192.7.4.255 | maps to nexthop L |
| 192.7.5.0 to 192.7.5.1 | maps to nexthop M |
| 192.7.5.2 to 192.7.5.3 | maps to nexthop N |
| 192.7.5.4 to 192.7.5.255 | maps to nexthop M |
| 192.7.6.0 to 192.7.6.255 | maps to nexthop R |
| 192.7.7.0 to 192.7.7.255 | maps to nexthop P. |

All of the above 32-bit DEST_IP addresses include the same leading 22-bits, yet map to five different nexthop values, according to the remaining 10-bits of DEST_IP. That is, a prefix match of greater than 22-bits can be necessary to ensure proper routing takes place. Accordingly, a P3 pointer may be provided that corresponds to the particular leading 22-bits (binary 1100 0000 0000 0111 0000 01). As noted above, the P3 pointer may (in combination with the BASE3K value) provide a base address for a chunk having four address groups. These address groups are selected according to the first two L3bits [9:8]. Thus, for a given DEST_IP search key, variations in the first two L3bits [9:8] can result in the selection of either a 192.7.4/24 group ([9:8]=00), a 192.7.5/24 group ([9:8]=01), a 192.7.6/24 group ([9:8]=10) or a 192.7.7/24 group ([9:8]=11). Each group may be stored as compacted or fully enumerated depending upon whether address matching beyond the first 24-bits of DEST_IP [31:8] is required. The resulting third array chunk for these rules is set forth in FIG. 4.

For the given example above, when the leading 24-bits of DEST_IP equals 192.7.4/24 (bits [9:8]=00), all keys map to nexthop L, regardless of the value of DEST_IP[7:0]. Therefore, in this case prefix matches beyond 24-bits are not required. Accordingly, the DEST_IP[9:8]=00 group can be stored compacted, and may include only one entry containing the nexthop value L. In contrast, when the leading 24-bits of DEST_IP equals 192.7.5/24, a 31-bit prefix match may be required to detect the 192.7.5.2 case. Accordingly, the 192.7.5/24 group can be fully enumerated, having 256 entries, one for every possible variation of the last eight DEST_IP bits [7:0]. The first two entries of the 192.7.5 group will correspond the DEST_IP values 192.7.5.0 and 192.7.5.1, and so may each store the nexthop value M. The next two entries, corresponding to 192.7.5.2 and 192.7.5.3 may store the nexthop value N. The remaining entries of the 192.7.5 group may correspond to the DEST_IP values 192.7.5.4 to 192.7.5.255, and so can contain the nexthop value M. The remaining two groups (192.5.6/24 and 192.5.7/24) are like the first group, and may require a prefix match of less than 25-bits, and so can be compacted, storing the nexthop values R and P, respectively.

The P3 pointer for the above described example could have an ELIDE code "0100" and point to a chunk within the third array 120 having 259 values (three compacted groups and one fully enumerated group). The entries can be identified by their offset location (0–259) within the chunk. The first, second, third and fourth groups are shown as items 400, 402, 404 and 406. In this manner, chunks within the third array will include compacted groups for shorter prefix matching cases (i.e., 23–24 bits) and fully enumerated groups for longer prefix matching cases (25–32 bits).

A sample third array entry that may be used with the first embodiment 100 is illustrated in FIG. 5. The third array entry 500 (like all of the third array entries in this particular embodiment) is a directly encoded entry and provides a 15-bit nexthop value. The most significant bit [15] may be reserved. It is noted that like the entries of the first and second arrays (116 and 118) the third array 120 entries can have a bit width (16-bits) that is advantageously suitable to standard memory device configurations.

To summarize the most complex search case, two examples of look-up operations that result in accesses to the chunk of FIG. 4 will now be described. In the first example, it is assumed that the DEST_IP value of 192.7.6.120 is applied. The initial eight bits (192.7) can be applied as an address to the first array 116. Because the rules indicate a prefix match or masked prefix match of greater than 16-bits is required, the corresponding entry in the first array 116 can be a P2 entry 202. An L2BaseDivTwo value can be output from the first array 116 and serve as a base address to a chunk within the second array 118. The CODEPTR value, may be used with the L2bits to generate a second array offset value. The second array offset value may be added to base address to provide the address to the second array 118. Because the rules indicate a prefix match greater than 22-bits is required, the corresponding entry can be a P3 entry 202. The L3BaseDivFour value and the BASE3K value from the P2 entry 202 may serve as a base address to the chunk shown in FIG. 4. The first two L3bits (10) indicate that the third group can be selected. Furthermore, the 0100 ELIDE codes shows that third group can be compacted. The appropriate offset value (257) can be generated and added to the base address, resulting in the nexthop value "R" being output. The generation of third array offset values will be discussed in more detail at a later point herein.

In the second example, it is assumed that the DEST_IP value of 192.7.5.5 is applied. The first array and second array accesses take place in the same general fashion as the 192.7.6.120 case. However, the first two L3bits (01) in this example indicate that the second group will be selected. The 0100 ELIDE codes shows that second group is fully enumerated. Thus, the last eight L3bits (0000 0101) are used to select offset=5 within the second group. The nexthop value M will be output. As noted above, the generation of third array offset values will be discussed in more detail at a later point herein.

General Method

While the first embodiment 100 is set forth in a block schematic diagram, the operation of the embodiment can be expressed as a method. This illustrates how, while optimized for a hardware implementation, the present invention may also take the form of a computer system that provides the means for performing a series of functions that take a variable prefix lookup value and provide a resulting match output value. This function, as noted previously, can perform the useful and important IP address lookup function of a router, as well as other prefix-match and masked-prefix-match functions.

The method is set forth as in FIG. 6, and is described in "pseudocode," a broad way of expressing the various steps in a method. The pseudocode may be implemented into particular computer language code versions for use in a system employing a general processor. In addition, the described method can be implemented in a higher level hardware designing language, to enable the preferred embodiment to be realized as an application specific integrated circuit (ASIC) or a portion of an ASIC. Pseudocode is widely used in industry and textbooks to express methods, and would be understood by one skilled in the arts of computer systems and/or hardware designing arts.

The method of FIG. 6 expresses the general functionality of the system engine set forth in FIG. 1. The lines of the method are each numbered. It is understood that this line numbering (and the line numbering of all methods set forth herein) is included in order to describe the method, and should not be construed as indicating a particular order of functions, or limitation to a particular computer language type or format. The method utilizes the terms "M1," "M2" and "M3" to designate three arrays. In addition, each input value is already split into three consecutive portions. L1bits, L2bits and L3bits. A "nexthop" value in FIG. 6 represents an output from the array functions that can be used by a router to point to a particular output interface within the router.

The first line describes an access to the first array (M1) using a first portion of the input value (L1bits). The access can provide a first array output (m1). The second line describes the operation of outputting the m1 value in the event it is a nexthop value. The third and fourth lines describe the resulting operation if the m1 value is not a nexthop value.

In such a case, the m1 value can be utilized to access the second array (M2) to provide a second array output m2. The fifth line describes the operation of outputting the m2 value in the event it is a nexthop value. The sixth through eighth lines describe the operation of utilizing the m2 value, when it is not a nexthop value, to access the third array (M3).

In this manner, accesses to three independent arrays can be pipelined to perform a longest prefix matching function.

Second Address Generator

Having described a first embodiment 100 and a data structure that may be used in conjunction with the first embodiment 100, a particular second address generator, for generating offset addresses within a second-array chunk will now be described.

Each second-array chunk can carry 64 pieces of information: one for each possible value of L2bits (DEST_IP [15:10]). For each possible value of L2bits, the chunk can indicate either a nexthop, or a P3 value to direct the search further. To achieve efficient memory usage, in the first embodiment the second array chunk can be stored compressed. When several sequential L2bits values (n, n+1, n+2, etc.) map to the same nexthop or P3 value, only one copy of the chunk entry may be stored in the second array. The summarization code, that can be fetched from the first array along with the second array chunk base address, can specify one bit for each of the 64 possible L2bits values, indicating for that L2bits value whether there is an entry stored in the chunk (meaning its entry was different from the one immediately preceding), or not (meaning that the entry is the same as one stored for a smaller value of L2bits). Storing this code value in the obvious way would require 64-bits in the first array for the code field. To reduce the amount of storage required in the first array, the present invention instead stores a "dictionary" which contains 256 distinct 64-bit code values. Then the first array may only need to carry an 8-bit index (CODEPTR) into the code dictionary, to select one of the 256 code values.

Figure 7:
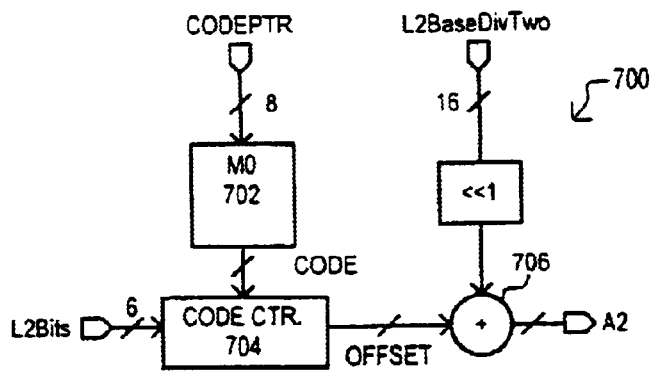
FIG. 7 is a schematic diagram illustrating a second address generator that may be used in the first embodiment.

The second address generator corresponding to this approach is set forth in FIG. 7 and designated by the general reference character 700. The second address generator 700 is shown to include a code dictionary 702, a code counter 704, and an adder circuit 706. The code table 702 can receive the CODEPTR value, and in response thereto, provide a 32-bit code (CODE). The CODE value can be applied to the code counter 704. The code counter 704 uses the L2bits, and by referring to the CODE value, can generate an OFFSET value. The OFFSET value can be combined with the L2BaseDivTwo value in the adder circuit 706 to generate the A2 address. In this manner, an offset value (OFFSET) may be added to a base address (L2BaseDivTwo, left-shifted by 1 bit to restore the original L2BASE value) to generate the A2 address.

As an example, for the previously described two rule case

| 192.7/16 | → Nexthop X |
| 192.7.4/22 | → Nexthop Y, | the chunk for DEST_IP[31:16]=192.7 could be summarized by a 64-bit code value as follows.

| L2bits | CODE 64 | Maps to |
| --- | --- | --- |
| 0 | (1) | Nexthop X |
| 1 | 1 | Nexthop Y |
| 2 | 1 | Nexthop X |
| 3 | 0 | Nexthop X |
| 4 | 0 | Nexthop X |
| 5 | 0 | Nexthop X |
| 6 | 0 | Nexthop X |
| 7 | 0 | Nexthop X |
| — | — | — |
| 63 | 0 | Nexthop X. |

In the arrangement described, the initial bit of the CODE value is always an implicit "1." Thus, the resulting 64-bit code can be written (in hexadecimal format) as E000 0000 0000 0000. One of the entries in code dictionary 702 will thus have been programmed to the value E000 0000 0000 0000, and the P2 entry fetched from the first array can contain in its CODEPTR field the corresponding index within the code dictionary 702.

Once the 64-bit code is established, to generate an offset value, the L2bits can be used to locate a position in the 64-bit code, and the number of "1s" to the left (or upward in the table above) of the location are then counted. One is subtracted from the count, and the resulting value is the offset value. For example, for the 64-bit code E000 0000 0000 0000, in the event the L2 bits were equal to 1 (000001), the number of 1s to the left of (and including) the second bit of the code would be counted; in this case the result is two, since the first and second bit are both equal to 1. One is subtracted to give an overall offset value of 1. For this particular second-array chunk, whenever L2bits are 2 or higher, the number of 1 values to the left of the entries will be three, and the resulting offset will be two. The second array 120 chunk corresponding to the example could have three entries: a base address plus offset=0 containing nexthop X, a base address plus offset=1 containing nexthop Y, and a base address plus offset=2 containing nexthop X.

It will be noted that of all the possible 64-bit CODE values that might arise in summarizing the second-array chunks in a table, only a small number can be stored in the code dictionary 702. Accordingly, code dictionary entries may be "merged" at the penalty of including "extra" second array entries. As an example of a merged code, suppose that one second-array chunk, when optimally expressed, has two nexthop entries (A, B) and a corresponding code value of C000.0000.0000.0000, and a different second-array chunk, when optimally expressed, has three nexthop entries (C, D, E) and a corresponding code value of C800.0000.0000.0000. Then, if the first chunk is expressed using the second code value C800.0000.0000.0000, three chunk entries will be required (A, B, B). The third entry is required because the code value used has more "1" bits than minimally needed. In general, any code value C2 can be substituted for a code value C1, if C2 has a "1" in all the positions where C1 has a "1". For a chunk that can be optimally compressed with code C1, expressing the same chunk with code C2 requires extra redundant storage for each extra "1" bit in C2.

The advantage of using less-optimal code values to compress some chunks, is that then the number of unique code values to be stored in the code dictionary can be kept small.

The first embodiment includes a further aspect to reduce the storage required for the code dictionary. In place of a 64-bit code value that would be stored in the code dictionary, only 32 bits are stored, where each bit i of code32 can be the logical "or" of bits (2i) and (2i+1) of the original 64-bit code. When the code32 is fetched from the code dictionary, it is conceptually expanded to 64-bits by repeating each bit twice. This reduction from 64-bits to 32-bits, like the substitution of code values, has an effect on the number of entries stored in chunks in the second array. When bits (2i) and (2i+1) of the 64-bit code are 00 or 11, the chunk is not affected. When the adjacent bits are 01 or 10, an additional duplicate second-array entry is required.

First Level Lookup Method

The operation of looking up prefix values (lookups) in the first array, and generating a second address for a second array, can be represented in method form. Referring now to FIG. 8, a method for accomplishing lookups to the first array and second array is set forth in pseudocode form. The method begins by defining a first array (M1) having values (m1) accessed according to the L1bits value. The next three lines illustrate a 16 or 17-bit bit prefix or masked prefix matching function. The m1 value can be examined to detect the presence of a "leaf" flag. In the event a leaf flag is present, the L1bits [31:16] can select two nexthop values, and the seventeenth bit [15] can select one of these two nexthop values.

The fifth and sixth lines describe the generation of a code value (m0code). In the event there is no leaf flag, the CODEPTR field of the resulting M1 output value (m1.codeptr) can be applied to a code array (M0). The M0 array can contain a code library that provides a code value according to the applied m1.codeptr value. The seventh and eighth lines indicate the division of the L2bits into two portions (L2bits_a and L2bits_b). The ninth line describes the use of the first portion of L2bits (L2bits_a) in conjunction with the m0code value to generate two offset values. In the tenth line, one of the two offset values is selected with the second portion of the L2bits (L2bits_b). The last two lines represents the combination of the selected offset value (L2Offset) with a base address value (L2BaseDivTwo<<1) to generate a second array address. The second array address is then applied to the second array.

Third Address Generator

Figure 9:
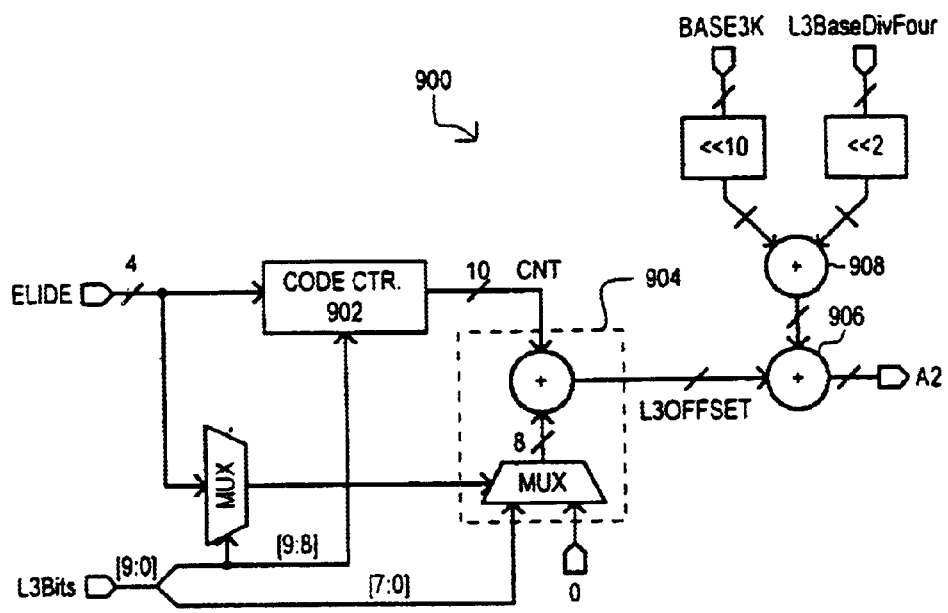
FIG. 9 is a schematic diagram illustrating a third address generator that may be used in the first embodiment.

Having described a second address generator, and a method for accomplishing first level lookups, a particular third address generator will now be described. The third address generator is set forth in FIG. 9 and designated by the general reference character 900. The third address generator 900 is shown to include an elide code counter 902, an elide adder 904, a first address adder circuit 906, and a second address adder circuit 908. Elide code counter 902 can receive the first two L3bits [9:8] and the ELIDE code from a P3 entry, and provide an address-group offset CNT to the elide adder 904. In the particular arrangement of FIG. 9, the value of the address-group start index (CNT) may be determined by the value of bits [9:8] and the four-bit ELIDE value. The address-group start index CNT can be determined by examining as many ELIDE bits as specified by the [9:8] search key bits, hence zero to three ELIDE bits. For each ELIDE bit examined, either 1 or 256 is added to the CNT result, depending on whether the ELIDE bit is zero (compacted) or one (fully enumerated). Finally, the next ELIDE bit after the last one so counted is examined. If it is a zero (compacted), the elide adder 904 adds nothing to the CNT value. If it is a one (fully enumerated), the elide adder 904 adds the search key bits [7:0] to the CNT value.

The resulting elide adder 904 output is an offset value (L3OFFSET) that is applied to the first adder 906. The BASE3K value from the first array 116, left-shifted by 10 bits, and the L3BaseDivFour value from the second array 118, left-shifted by 2 bits, are combined in the second adder 908, and then added to the offset value L3Offset in the first adder 906. The output of the first adder is a third array address A3.

The generation of the L3OFFSET value of the third address generator 900 may be best understood by an example. If an ELIDE code of "0110" is applied in conjunction with an L3bits value of "10 1110 0110," the first two bits of the L3Bits value ("10") can result in an address-group start index CNT=257 from the elide code counter 902. This value is determined because [9:8]="10", so two bits of ELIDE are examined. The first bit of the ELIDE code (0) adds one to the output total, and the second bit of the ELIDE code (1) adds 256 to the output total of elide counter 902. Then, since the third bit of the ELIDE code is "1," the last eight bits of the L3bits [7:0] are added in the elide adder 904. The resulting L3offset value will be equal to 1+256+230= 487.

In this manner, the third address generator 900 utilizes values from the first array (BASE3K) and the second array L3BaseDivFour to form a base address value for the third array. Such an approach can allow for reduced width second array entries, while still allowing for a third array with a substantial number of entries (a "deeper" third array). The use of the ELIDE code and L3Bits to generate third array offset values (L3OFFSET) can allow the third array to more compact, as 256 entries are only required when a longest prefix match of greater than 24-bits is required.

Second and Third Level Lookups

The operation of lookups in the second array, and the generation of addresses for the third array, can also be represented in method form. Referring now to FIG. 10, such a method is set forth in pseudocode form. The method begins by defining a second array (M2) having values (m2) accessed according to a second array address (A2). The second line indicates the examination of the m2 value to determine the presence of a "leaf" flag. If a leaf flag is present a nexthop value is output.

The fourth and fifth lines describe the division of the L3bits into two portions (L3bits_a and L3bits_b). In the sixth line, the L3Offset value is initially set to zero, prior to an elide code adding operation. The next two lines (seventh and eighth) describe the addition of 1 or 256 to the L3Offset value according to all but the last L3bits_a value and the elide code. Line nine illustrates the addition of the L3bits_b value to the L3Offset value when the last L3bits_a value corresponds to a "fully enumerated" elide code value. Line 10 describes the addition of first and second array values (m1.Base3k<<10 and m2.L3BaseDivFour<<2) to the L3Offset value to generate a third array address (A3).

The remaining lines describe a third array (M3) that provides output values (m3) according to the A3 address value. The m3 value is then output as a nexthop value (m3.nexthop).

First Alternate Embodiment

The above diagrams and router longest prefix matching methods have described embodiments that can utilize an advantageously compact data structure. In particular, the first array entries are 32-bits wide, while the second and third array entries are both 16-bits wide. Such a particular approach to the present invention should not be construed limiting. In the event memory entry widths can be wider, first array entries can take the general forms set forth in FIG. 11. Leaf entries 1100 could include a flag bit (LF) and then one or more nexthop values (NEXTHOP(S)). In the event multiple nexthop values are stored in leaf entries, one or more bits beyond those used to access the first array may be needed to select between the nexthop values. For example, if the first 16-bits of an input value (such as DEST_IP) are used to access a first array, the seventeenth bit can be used to select between two nexthop values.

Second array pointer entries 1102 can include a pointer flag bit (P2), a second array base address (L2BASE), and a code value (CODE). The code value may be similar to the 64-bit code value discussed above. Such a code value could include one bit location for every possible variation for a second portion of an input value. For example, if the first array was accessed according to an initial portion of an input value (such as the first 16-bits of DEST_IP), and the second array is accessed according to a 6-bit second portion, the CODE value could include 64 entries, one for each possible variation in the 6-bit second portion. Alternatively, the CODE value could be compressed one or more times. As just one example, the CODE value could be generated by logically ORing adjacent bits one or more times. For example, a 64-bit code could be expressed using 32-bits, as previously described. The use of such a code value can eliminate the need for a code dictionary, such as item 702 of FIG. 7, and/or eliminate the need for M0[codeptr] array in the method of FIG. 8. Of course, the L2BASE value could be a complete base address, or a multiple of 2 or higher, in which case selected input bits from a second portion could be used to determine a single base address. L2BASE values that are multiples of powers of two can allow for deeper second arrays.

Figure 11:
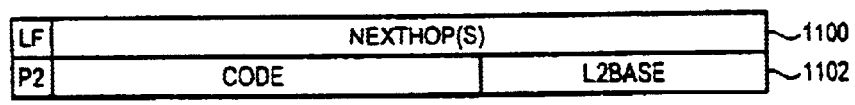
FIG. 11 is a diagram of first array entries according to an alternate embodiment.
Figure 12:
FIG. 12 is a diagram of second array entries according to an alternate embodiment.

When a very compact data structure is not as critical a concern, first array entries can take a similar form to those of FIG. 11. To illustrate this point, sample second array entries are set forth in FIG. 12. Second array leaf entries 1200 can include a leaf pointer (LF) and one or more nexthop values (NEXTHOP(S)). For leaf entries having multiple nexthop values, one of the nexthop values can be selected by one or more bits from a third portion of an input value. The second array can include third array pointer entries 1202 that include a pointer flag (P3), and a third array base address (L3BASE). Like the second array base address (L2BASE) of FIG. 2, the third array base address could be a complete base address, or a multiple of 2 or higher, in which case selected input bits from a third portion could be used to determine a single base address. L3BASE values that are multiples of two may also allow for deeper third arrays.

The previously described embodiments represent block diagrams and methods optimized for implementation into hardware. The methods, or equivalents, can be implemented in a hardware design language, such a Verilog or VHDL, to name just two possible limited examples. Utilizing design tools that are well understood in the art, these hardware equivalents could then be transformed into integrated circuit layout form, and be fabricated as an integrated circuit, or as one portion of a larger integrated circuit. As noted above, however, the methods can also be implemented on a system having a general purpose processor. Accordingly, a second embodiment, optimized for use with a general purpose processor, will be described below.

Second Alternate Embodiment—Optimized for Software Implementation

An additional alternate embodiment, illustrating a routing method that receives a target IP address, and in response thereto, provides a nexthop value, is set forth in pseudocode form in FIGS. 13 and 14. FIG. 13 illustrates first level lookups that access a first array M1, and provide either a nexthop value or an address to a second array. FIG. 14 illustrates second and third level lookups that access the second array and provide either a nexthop value or an address to a third array. Third array addresses are applied to the third array to also generate nexthop values.

Referring now to FIG. 13, the first level lookup method begins by accessing the first array (M1) by applying a first portion of a target address input value (L1bits). In the particular arrangement of FIG. 13, the L1bits can represent the first 16-bits [31:16] of a 32-bit target address. In line 1, the resulting output of the first array (m1) is examined for a leaf flag. If a leaf flag is present, the resulting m1 value may include four nexthop values (m1.nexthop0, m1.nexthop1, m1.nexthop2, and m1.nexthop3). One of the four nexthop values (m1.nexthop0–3) is selected according to bits [15:14]. This operation is illustrated by lines 2–6.

If a leaf flag is not present, the m1 value can be a second array pointer value, and may be used to generate a second array address. Unlike the embodiment set forth in FIG. 8, code pointer values are not used, and instead, each second array pointer value can include a 32-bit code value (m1.code). The remainder of the method describes the generation of a second array address, and utilizes a second portion of the 32-bit input value, L2bits. In the particular arrangement of FIG. 13, the L2bits includes bits [15:10]. The seventh through ninth lines indicate the division of the L2bits into two portions (L2bits_a and L2bits_b). In line 10, the first portion of L2bits (L2bits_a) is applied to the code value (m1.code) to generate an offset value that is a multiple of two. In the eleventh line, the offset value is added to a second array base address (m1.L2Base) to generate a second array address (A2).

Figure 15:
FIG. 15 is a diagram of first array entries according to the second embodiment.

An example of first array entries according to the embodiment of FIG. 13 is set forth in FIG. 15. Leaf entries 1500 can include a 1-bit leaf flag (LF), and four nexthop values (NEXTHOP0, NEXTHOP1, NEXTHOP2, and NEXTHOP3). Second array pointer entries 1502 can include a 1-bit pointer flag (P2), a 32-bit code value (CODE), and an 18-bit second array base address value (L2BASE).

Referring now to FIG. 14, second and third level lookups optimized for implementation with a general purpose processor will be described. The method of FIG. 14 begins by accessing the second array M2 with address A2 to provide a second array output value (m2). The m2 value is examined for a leaf flag (LF). If a leaf flag is present, the resulting m1 value will include two nexthop values (m2.nexthop0 and m2.nexthop1). One of the two nexthop values (m2.nexthop0–1) will then be selected according to the low-order bit of L2bits [10]. This operation is illustrated by lines 2–4.

In the event a leaf flag bit is not detected, beginning on line 5, a third array address can be generated. The sixth through eighth lines describe the division of the target address values into two portions (L3bits_a and L3bits_b). L3bits_a includes bits [10:7] and L3bits_b includes bits [6:0]. In the ninth line, an L3Offset value is initially set to zero, prior to an elide code adding operation. The next two lines (tenth and eleventh) describes the addition of 1 or 128 to the L3Offset value according to all the but the last L3bits_a value and the elide code. In contrast to first embodiment, the elide code of FIG. 14 is 16-bits. Line twelve illustrates the addition of the L3bits_b value to the L3Offset value when the last L3bits_a value corresponds to a "fully enumerated" elide code value. A third array base value (L3Base) from the second array is added to the L3Offset value to generate a third array address (A3). The third array M3 provides output values m3 according to the A3 address value.

Figure 16:
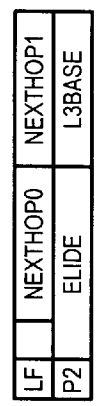
FIG. 16 is a diagram of second array entries according to the second embodiment.

An example of second array entries according to the embodiment of FIGS. 14 and 15 are set forth in FIG. 16. Leaf entries 1600 can include a 1-bit leaf flag (LF) and two nexthop values (NEXTHOP0 and NEXTHOP1). Second array pointer entries 1602 can include a 1-bit pointer flag (P2), a 16-bit code value (CODE), and a 15-bit third array base address value (L3BaseDivFour). Third array entries for the second embodiment can take the same format as that set forth in FIG. 5.

The embodiment described by FIGS. 13–16 can be more efficient when implemented with a general purpose processor because it can take advantage of the functions provided by general purpose processor memories and cache systems. Conventional general purpose processors, such as a central processing unit (CPU), can generally fetch 64-bits in the same amount of time it takes to fetch 32-bits. This is because if an access hits a level one cache in the CPU, both accesses will be fast. If a level one cache hit is missed, and entire level two cache line will be loaded from main memory. This accounts for the wider (64-bit) width of the first array entries.

Third Alternate Embodiment—Address Feed Forward

In the event deeper memory arrays are required, the second and even the third arrays can each include multiple sub-arrays. A given sub-array can then be selected according to a given group of bits in an applied input value. The given bits, which are used to "decode" the sub-arrays, can be considered "feed-forward" bits. A block schematic diagram of a third embodiment that utilizes feed-forward address bits is set forth in FIG. 17.

Figure 17:
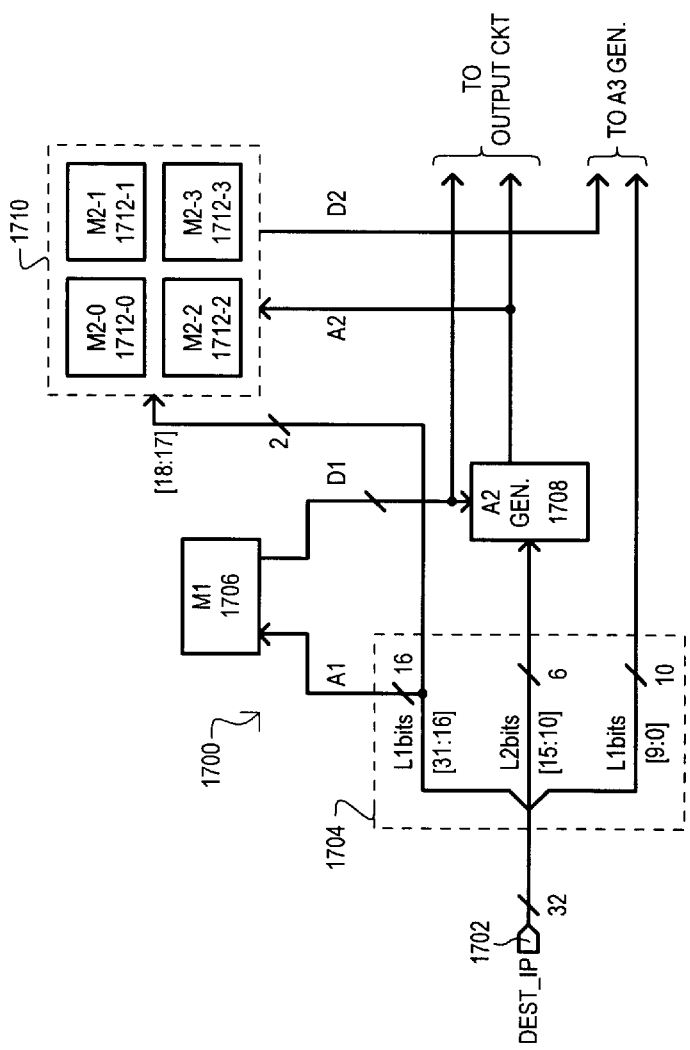
FIG. 17 is a schematic diagram illustrating a third embodiment.

Referring now to FIG. 17, the third embodiment is designated by the general reference character 1700, and is shown to include many of the system constituents as the system set forth in FIG. 1. A target address input 1702 can receives a 32-bit DEST_IP value, and a value splitting section 1704 can split the DEST_IP value into three portions. The three portions may include L1bits [31:16], L2bits [15:10], and L3bits [9:0]. Like the first embodiment 100, the L1bits can be applied to a first array 1706 as a first array address (A1). The first array 1706 may provide output data (D1) that is a directly encoded value or a second array pointer value. Second array pointer values, in combination with the L2bits, can be used to generate a second array address (A2). The A2 address can be applied to a second array 1710 to produce a second array output data (D2).

The third embodiment 1700 differs from that of the first embodiment 100 in that the second array 1710 can be logically divided into four sub-arrays (M2-0, M2-1, M2-2 and M2-3) labeled 1712-0 to 1712-3. In addition, the second array 1710 is shown to further receive two feed-forward bits [18:17]. In the arrangement of FIG. 17, each sub-array (1712-0 to 1712-3) can receive the same A2 address. While the four sub-arrays are simultaneously accessed by the A2 address, only one sub-array (1712-0 to 1712-3) may be selected to provide the output data D2. The selection of one sub-array can determined according to the feed-forward bits [18:17]. In this manner, the depth of the second array 1710 may be expanded by utilizing bits [18:17] that index to one array (M1), to select one of a number of sub-arrays (1712-0 to 1712-3) within a second array (M2). The particular embodiment of FIG. 17 utilizes the bits 18:17, but in general any function of the L1bits [31:16] could be used.

The particular structure of the second array 1710 can be subject to considerable variation. As just a few particular examples, each sub-array (1712-0 to 1712-3) may be an individual memory integrated circuit (IC) having a "chip enable" input that receives one of the feed-forward bits or its inverse. Alternatively, a 4-into-1 multiplexer, controlled by the feed-forward bits, could be employed that selectively provides the output of one of the memory ICs as the D2 output. Furthermore, each sub-array (1712-0 to 1712-3) could be portions of a single memory IC, or an integrated (i.e., embedded) memory, in which the feed-forward bits are used as two address bits. Feed-forward bits may also be subject to some processing prior to being used in the selection of a sub-array, or the like. As just one example, information in a portion (such as L1bits, as just one example) of an input value may be processed by a hash function, or some other transformation.

The output of the second array 1710 (D2) along with the L3bits can be passed on to a third address generator (not shown). If depth expansion of a third array is also desired, the same feed-forward approach can be used.

Compiling of Data Structure

Having described various particular embodiments of the present invention, and data structures that may be used in conjunction with the embodiments, a preferred data structure compiling method will now be described. The preferred table compilation method described can result in a data structure that may be used in the various embodiments set forth in FIGS. 1–10. The data compilation approach is set forth as two pseudocode methods in FIGS. 18A and 18B. The two methods illustrate the functional steps involved in a "first pass" which establishes an initial data structure in response to a collection of routing rules, and a "second pass" which consolidates the initial data structure to form a final, advantageously compact data structure.

Referring now to FIG. 18A, the first pass method is shown to begin with the initialization of an M1 array such that all locations point to a "null" or default route (line 1). The format of each rule is then established (line 2). Each rule can indicate a prefix length (prefixlength), an internet protocol (IP) address (ipaddr), a mask (mask) specifying any "gap" bits, and a corresponding nexthop location (nexthop). The various portions of the ipaddr value (L1bits, L2bits and L3bits) are then extracted (line 4). One of a number of functions is then executed according to the prefix length corresponding to the given rule.

When a prefix length is less than or equal to 16-bits, the nexthop value for the rule will be stored in multiple first array (M1) leaf entries, by the StoreInM1 subroutine. The M1 entries stored can correspond to the address range, including any gap don't-care bits, that is covered by the given prefix or masked prefix. Because the particular data structure produced by preferred data compiler produces first array entries such as those set forth in FIG. 2, each first array leaf entry may include two nexthop storage fields (nh0 and nh1). Accordingly, the same nexthop value will be stored into both storage fields, so the "whichhop" parameter to StoreInM1 is set to binary "11" (lines 19 and 20).

When a prefix length is equal to 17-bits, a nexthop value may be stored into one of the two nexthop fields (nh0 or nh1) of a leaf entry corresponding to the L1bits of the ipaddr value (lines 8 and 9), repeated for each possible value of the gap don't care bits. In this manner, lines 1–9 establish leaf entries in a first array.

An example of a masked prefix, 14-bits long, is illustrative. Consider a masked-prefix rule as follows 10.14.0.0/255.60.0.0→Nexthop A.

The mask in this case has binary value 11111111.00111100.000 . . . , indicating that the first eight bits are part of the match, the next two bits are don't care "gap" bits, the next four bits are part of the match, and the remaining 18 bits are don't care bits after the end of the prefix.

To add this masked-prefix rule to the table, the j1 loop first treats it as an ordinary prefix. An ordinary (non-masked) prefix of length 14 would affect four locations in M1: 10.14, 10.15, 10.16 and 10.17, because a 14-bit prefix is equivalent to four contiguous 16-bit prefixes, and each M1 entry encodes a single 16-bit prefix. So, the j1 loop calls StoreInM1 once for each of the four above prefixes.

Within the StoreInM1 subroutine, the masked prefix is handled. Each time StoreInM1 is called, the j2 loop iterates once for every possible value of the gap bits. In this case the gap bits are the two zeros in the mask in bits [23:22]. The j2 loop index takes on four values corresponding to 00, 01, 10, 11 in those two bit positions: hence, the j2 loop index values in hexadecimal are 0x00000000, 0x00400000, 0x00800000, 0x00c00000. Since the j2 loop iterates four times for each of the j1 iterations, a total of sixteen M1 entries are written. In each case both the nh0 and nh1 fields are written. If the prefix length were 17 bits, only one of the fields (nh0 or nh1) would be written, according to the value of the $17^{th}$ bit, ipaddr[15].

For prefix lengths that are greater than 17-bits long, an L2chunk (and possibly an L3chunk) are affected. First, as shown by the StoreInM2 subroutine, a check is made to determine if there is already a level two chunk (collection of second array (M2) values) that corresponds to the L1bits of the input value. If no such chunk exists, one is created within the second array, and pointer to the level two chunk is placed in the first array. If the prefix is masked, and there are any don't care bits within ipaddr[31:16], then a pointer to this same L2chunk may be placed in several different M1 locations (lines 25 and 26). This many-to-one mapping, from M1 entries to L2chunks, allows for efficient implementation of masked-prefix matching. It is novel to the present invention; prior-art prefix-matching technologies have assumed a one-to-one mapping between results fetched from a "higher" level (here L1) and chunks at a "lower level" (here L2). The level two chunk is then examined to check for chunk entries (i.e., a second array base address or offset address) corresponding to the L2bits portion, and all associated L2bits values for all possible values of the don't care gap bits that fall within ipaddr[15:10]. If such entries do not exist, they are created in the second array. In addition, as new entries are created, the code value corresponding to second array pointer is updated (lines 28 and 29).

A next function will then be selected depending upon the length of the prefix. In the event the prefix length is less than or equal to 22-bits, one or more second array leaf entries are created for the level two chunk (lines 31 and 32). For prefix lengths that are greater than 22-bits, as shown by subroutine StoreInM3, a check is made to determine if there is already a level three chunk (collection of third array (M3) values) that correspond to each (L1bits,L2bits,gapbits) of the input value. If no such chunk exists, one is created within the third array, and pointer to the level two chunk is placed in the appropriate locations of the first array and second array (lines 39–44). Referring now to FIG. 18B, the second pass method is set forth, describing in detail the preferred data structure compilation approach as a series of functions embodied in pseudocode form. The second pass method begins by sorting level three chunks within the third array according to which first array pointer entry they belong to (line 1). A third array base address is then established (L3base) and initially set to zero (line 2). The third array base address is then stored in the first array pointer entry (e.g., BASE3K in FIG. 2) and the second array pointer entry (e.g., L3BaseDivFour in FIG. 3) (line 4).

Each level three chunk can then divided according to the first 24-bits of the ipaddr value, creating the four groups per level three chunk, as previously described (e.g., items 400, 402, 404 and 406 of FIG. 4). For each group corresponding to the leading 24-bits of the ipaddr value, the group is examined to determine if it is subdivided (i.e., a prefix match greater than 24-bits is required). In the event the group is not subdivided (i.e., all ipaddr values having the 24-bit prefix map to the same nexthop address) a corresponding elide code bit can be set to "0," and the third array entry is written out (e.g., a nexthop value is stored in the third array entry corresponding to the group). In the event the group is subdivided, a corresponding elide code bit can be set to "1." In addition, 256 entries for the group are written out (e.g., forming a fully enumerated group—such as item 402 in FIG. 4). Once the third array entry or entries are written, the value of "1" or "256" can be added to the third array base address, depending upon whether the group is subdivided or not (lines 3–9).

The third array may then be padded with null entries until the third array base address is a multiple of four. The resulting elide code can also be stored in the second array pointer entry (lines 10 and 11). In this manner, a compact third array data structure may be formed.

The embodiment of FIG. 18B proceeds by forming a compact second array data structure. A second array base address is established (L2base) and initially set to zero (line 13). The second array base address is then shifted one bit to the right to form a second array base address that is a multiple of two (L2baseDivTwo). The shifted second array base address may then be stored in the corresponding first array pointer entry. The resulting code value (code32) can then be stored in the corresponding first array pointer entry (lines 14–16). It is understood that this step could include placing a code pointer value in a first array pointer entry (in the event a code dictionary is employed).

The level two chunks may then created by examining the code value, and writing two second array entries for each "1" value in the code bit (lines 17 and 18). To maintain the correct offset values, a value of two may then be added to the level two base address.

While the embodiment of FIGS. 18A and 18B may be implemented in hardware, in the preferred approach, the series of functions may take the form of a method executed on a general purpose processor. In such an embodiment, the general purpose processor can receive a collection of routing rules as input values, and provide the useful and novel data structure described (in particular forms) herein. The data structure may then be utilized by a router or network switch to accomplish rapid longest prefix matching operations. The resulting array values may be created and used in a system memory, or created in a system memory and then transferred to a memory dedicated to the data structure. Alternatively, the values can be written directly into a dedicated data structure.

Merging Codes

If reference is made back to the first array data structure of FIG. 2 and the second address generator of FIG. 7, it will be recalled that rapid longest prefix matching along with a compact data structure can be accomplished, in part, with a code dictionary that stores a small number of unique code values. One particular approach to forming a dictionary with few code values, such that a dictionary value may be substituted for any desired code value in an efficient manner, will now be described. The code merging approach utilizes a "cost" calculation for any candidate merger code. This calculation may be best understood by example.

Assume that a code table includes an entry i, having a 32-bit code value represented in hexadecimal form "E000 0000." This code is referenced 10 times, and is to be merged with an entry j, having a code value of "8000 8000" that is referenced three times. Because the entry i includes three "1" values, it will be given a "weight" of three. Similarly, because the entry j includes two "1" values, it will have a weight of two. If the codes were merged, the resulting value would be "E000 8000," and thus have a weight of four. That is, the merged code would add a single "1" bit to entry i, and two "1" bits to entry j.

The cost of a merger is calculated in the particular disclosed embodiment, by multiplying the number of times each code is referenced by the number of "1" bits added by the merger. For the merger of the i and j entries described above, the cost is calculated as shown below.

$$Cost(i, j) = (Count(i))(\Delta weight(i)) + (Count(j))(\Delta weight(j))$$

$$= (10)(1) + (3)(2) = 16.$$

The disclosed approach to code merging maintains a working array of every possible merger for 256 different codes (e.g., (0,1), (0,2) . . . (254,255)). As each "rawcode" (32-bit code) is presented, there is a test to determine whether any code table entry matches the rawcode directly. If a match exists, it is used (i.e., the second array pointer entry will include a code pointer value corresponding to the rawcode). If a match does not exist, the rawcode may be added as a new table entry. This will temporarily raise the number of codes in the table to 257. To reduce the code table to 256, the lowest cost of all possible mergers is selected, and the merge performed. The array merger costs is then updated for the new set of 256 entries.

Referring now to FIG. 19, a code merge method is set forth in pseudocode. The code merge method is intended to be used in combination with the data structure methods set forth in FIGS. 18A and 18B. In particular, the functional steps set forth in FIG. 19 are performed after the first pass method, but prior to the second pass method. The code merge method of FIG. 19 begins by focusing on each level two chunk, and extracting the code value (rawcode) for the chunk (lines 1 and 2). If the rawcode is already in the dictionary, the current count (the number of times the code is referred to) can be incremented by one. The "cost" array (described above) may then updated to take into account the incremented count value (lines 3–5). The next level two chunk is then examined (line 6).

In the event the code value is not in the dictionary, the code value can be added to the dictionary (line 9). Provided the dictionary remains smaller than a maximum (target) size (256 entries in the example above), the code merge approach moves on to the next level two chunk. If, however, the dictionary is at the maximum size, the lowest cost pair is determined and merged, opening up a dictionary entry (lines 9–11) for the new code value. The cost array is then recalculated, and the cost values corresponding to the recently deleted entry are removed (lines 12 and 13).

Updating Data Structure

In addition to providing a rapid longest prefix matching systems and corresponding data structures, the present invention further includes, as one aspect, an approach to updating data structures without forcing unduly long suspensions in routing functions. The preferred updating approach, advantageously, does not require a large amount of memory.

The preferred update approach is intended to a be a series of functions executed by a general purpose processor. It is assumed that the processor has access to all of the routing rules used to compile the data structure. In the preferred arrangement, a shadow data structure, such as a trie, is maintained which contains all the routing rules as initially input. Tries, or digital search trees, are described in numerous references, including for example G. H. Gonnet & R. Baeza-Yates, "Handbook of Algorithms and Data Structures 2/e," Addison-Wesley 1991, pp133–143. Particular recent variations are detailed for example in Doeringer et al., cited in the "Background of Invention" section above.

A particular updating approach will now be described that can be used in conjunction with the system of FIG. 1, and the corresponding data structure illustrated in FIGS. 2–5. The updating approach will be particularly described as a method in pseudocode, and in a series of figures that are diagrammatic representations of memory usage in a first, second and third array (such as items 116, 118 and 120). Finally, a method for managing the memory will be described.

Referring now to FIG. 19, an update method is set forth in pseudocode form. The update method utilizes some of the same identifying terminology as previous methods, including first, second and third arrays (M1, M2, M3), and dual nexthop entries (nexthop0 and nexthop1) for each first array entry. Leaf/Pointer identifications for the various arrays are identified by "LF" (for leaf flags), "P2" (second array pointer flag), and "P3" (third array pointer flag). Second array chunks and third array chunks are identified as "L2Chunks" and "L3Chunks," respectively. A high-level portion of a third array base address is shown as "Base3K."

The update approach begins by considering a routing rule change, and determining which first array entries are affected by the change (line 1). A different function is performed according to how a first array entry is affected. In the event a first array entry was a leaf entry prior to the routing rule change, and remains a leaf entry after the routing rule change, the nexthop addresses of the entry (e.g., NEXTHOP0 and NEXTHOP1 in FIG. 2) are changed according to the new routing rule (lines 2 and 3). In the event a second array pointer entry is changed to a leaf entry by new routing rule, the second array pointer entry is changed to a leaf entry with corresponding nexthop values. In addition, the level two chunk in the second array, that was pointed to by the (now erased) second array pointer entry, is tagged for deletion. Furthermore, any level three chunks in the third array, pointed to by the tagged level two chunk are also tagged for deletion (lines 4–6). The tagged second and third array entries may be deleted by a "garbage collector" method to be described at a later point herein.

The third case, in which a rule change results in a leaf entry being replaced by a second array pointer entry, is described by the remaining lines of the method (lines 7–14). For such a case, a new second array chunk, and any resulting third array chunks are created. The new third array chunks are stored within the third array after the last third array entry. In a similar fashion, any new second array chunks are stored within the second array after the last second array entry. In this manner, changes to the data structure can be implemented while not affecting the remaining entries. Hence, search functions need not be suspended while the update is in its partially completed state.

Once new second and third level chunks are stored, the corresponding second array pointer entry (within the first array) is updated to point to the new second array chunk. In the event new third array chunks have resulted, a new third array base pointer portion (Base3K) is written into the second array pointer entry. Any old second or third array chunks (accessed by a now outdated rule) are tagged for deletion. The approach of FIG. 19 concludes with an update to the shadow data structure.

The approach of FIG. 19 allows for updates that maintain coherency and concurrency throughout the update process, in that the routing rule changes do not take effect until the first array entry is updated. In this manner, second and third array data structures are created, but not accessed until a final write to the new second array pointer, which establishes the updated pointer values.

Figure 21A:
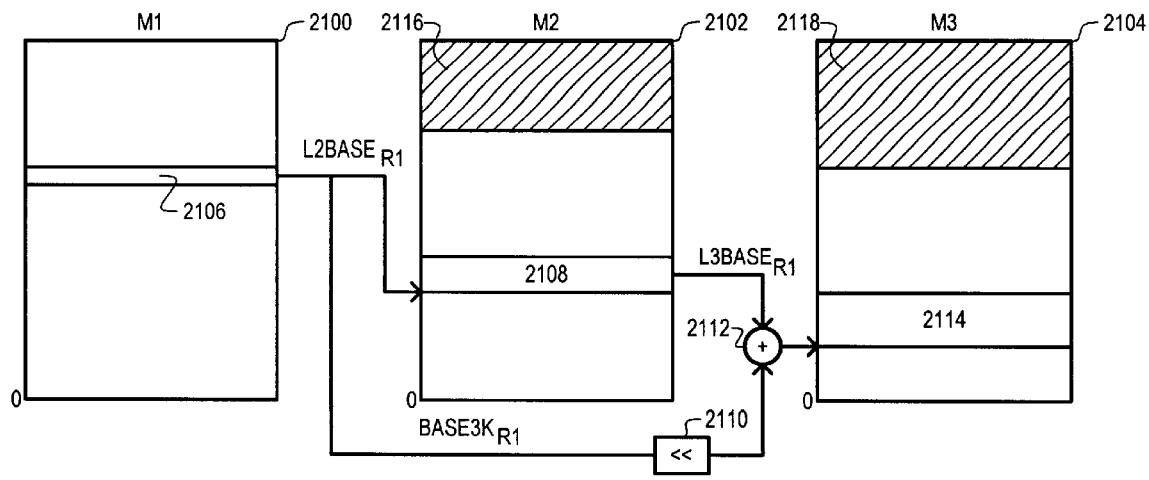
FIGS. 21A–21C are block diagrams illustrating a data structure update function according to a preferred embodiment.
Figure 21B:
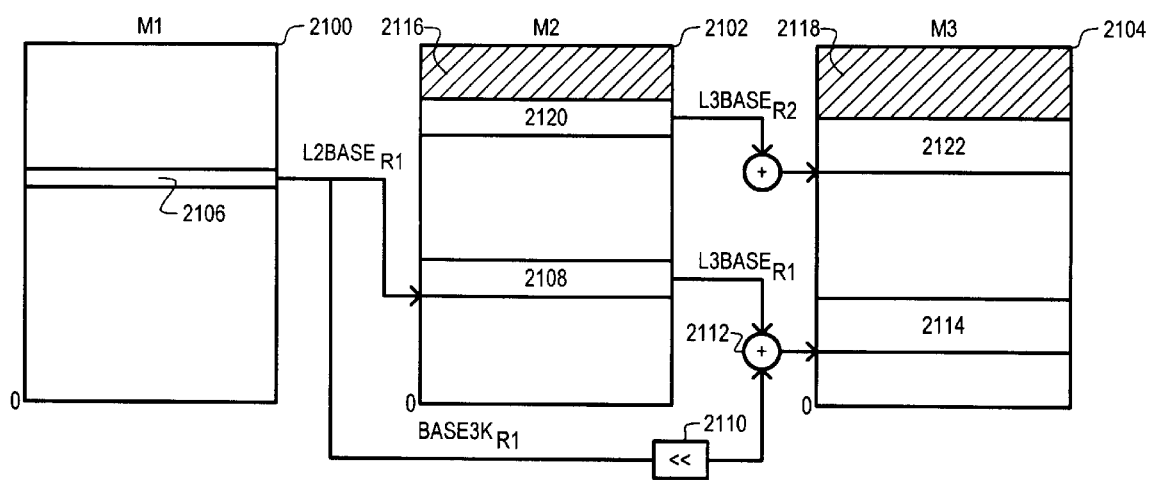
Figure 21C:
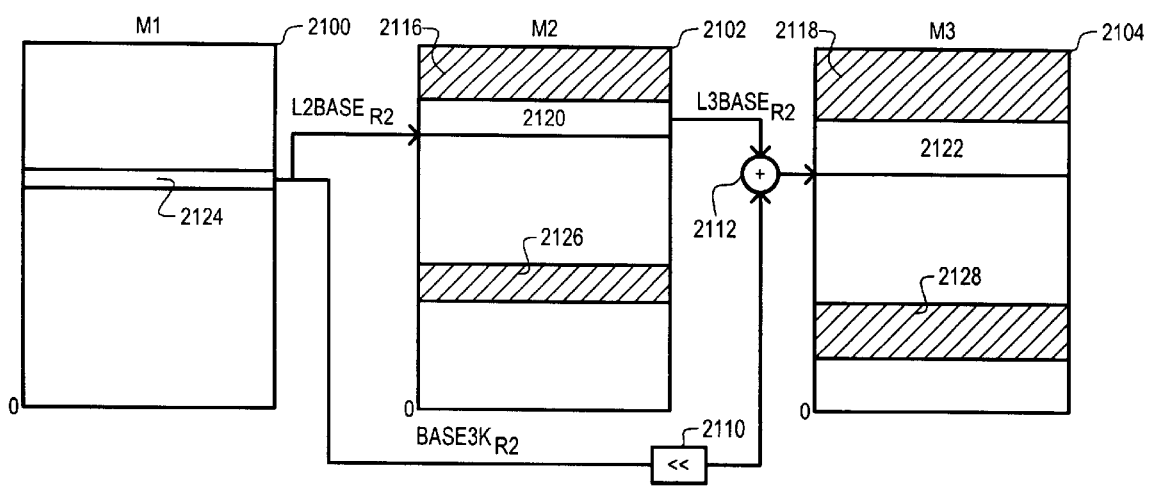

To better understand the particular update approach described, a series of block diagrams are set forth in FIGS. 21A–21C. Each figure includes a first array 2100, a second array 2102, and a third array 2104. The block diagrams of FIGS. 21A–21C illustrate the case where a rule change results in an initial second array pointer entry in the first array 2100 being replaced by a subsequent second array pointer entry. Furthermore, both the initial and subsequent pointer cases, result in a second array address that points to a third array pointer entry.

FIG. 21A illustrates a lookup operation prior to the rule change. An initial first array address (e.g., L1bits) results in the access to a pointer entry 2106 in the first array 2100. The pointer entry 2106 provides a second array base address (L2BASE$_{R1}$) used to access a second array chunk 2108, as well as high-level portion of a third array base address (BASE3K$_{R1}$). The BASE3K$_{R1}$ value is shifted by a shift circuit 2110.

The second array chunk 2108 provides the last portion of a third array base address (L3BASE$_{R1}$) which is added to the high-level portion (BASE3K$_{R1}$) in an adder circuit 2112. The output of the adder circuit 2112 points to a third array chunk 2114. It is noted that the second array 2102 includes an unused portion 2116 and the third array 2104 also includes an unused portion 2118.

Referring now to FIG. 21B, the same lookup operation during an update function is set forth. The access can occur as described in conjunction with FIG. 21A. However, the update method has now updated the second array 2002 with a new second array chunk 2120. The new second array chunk 2120 (required by a routing rule change) has been created at the "end" of the second array entries (begins at the first entry in the unused portion 2116). In the same general fashion, a new third array chunk 2122 (required by the routing rule change) has been created at the end of the third array entries.

FIG. 21C illustrates the lookup operation with the routing rule change now in effect. The previous pointer entry 2106 in the first array 2100 has been replaced by a new pointer entry 2124 resulting from the new routing rule. Now that the new pointer entry 2124 is in place, the new second array chunk 2120 can be accessed with a new second array base address value (L2BASE$_{R2}$). The new pointer entry 2124 also provides a high-level portion of a third array base address (BASE3K$_{R2}$). The second array chunk 2120 provides the last portion of a third array base address (L3BASE$_{R2}$), which can be combined with the high-level portion in adder 2112 to generate the base address to the new third array chunk 2122. In FIG. 21C, the (now) outdated second array chunk and third array chunk from the previous routing rule are deleted, resulting in new unused portions (2126 and 2128) in the second and third arrays (2102 and 2104).

The method of FIG. 19 can be modified for a lookup engine that employs a code table, such as that shown as item 702 in FIG. 7. For each new second level chunk, the lowest weight code that covers the rawcode corresponding to the new chunk, should be selected. To ensure that all possible new rawcodes can be merged and/or added, the code "FFFF FFFF" (all "1" bits) should be included in the code table.

Similarly, the use of feed-forward address bits, such as that illustrated in FIG. 17, may require some modification to the update approach. As just one example, each sub-array would be treated independently, having its own unused memory portion. Furthermore, when a chunk is rebuilt, it is stored in the proper sub-array.

The above described data structure update approach can be subject to some variation. For example, an "in-place" chunk replacement step can be included for selected cases in which a first array pointer entry is replaced by a new first array pointer entry. In-place chunk replacement involves the functional step of completing replacements in the third array in the manner described above. Next, a new second array chunk is compared to the old second array chunk made obsolete by the new routing rule. If the new second array chunk differs only slightly from the old second array chunk, the new second array chunk can be written into the location of the old second array chunk, rather than at the end of the second array entries.

The above described in-place replacement function is intended to work for the data structure of FIGS. 2–5. However, such an efficient variation on the update approach can also be applied to other data structures, such as the software optimized data structure of FIGS. 15 and 16. Because the data structure of FIGS. 15 and 16 does not include a higher level third array base address portion (e.g., BASE3K), third array chunks, in an update operation, can be treated independently, and need not be updated together. As a result, in such a case, in-place chunk replacement can include the functional step of determining if chunks can be replaced "in-place" for each new third array chunk.

The functional steps involved in updating a data structure described so far can be considered an "ADD" operation that results from the addition of a new prefix and nexthop value pair. However, many update operations may only require the nexthop value for a given prefix to be changed. Such an operation is referred to here as a "HOPCHANGE."

HOPCHANGE operations involve the functional step of determining all the second array entries and third array entries that are affected by the change in nexthop value. The nexthop value for these locations are then changed, obviating the need to create any new level two or level three chunks. A prefix trie such as that presented in Doeringer et al. may be advantageously used to find those second and third array entries affected by HOPCHANGE operation.

The HOPCHANGE operation may also be used for rule deletion operations. For example, two routing rules are set forth below.

| 192.9.28/24 | → nexthop A |
|---|---|
| 192.9.128/25 | → nexthop B. |

It is noted that the second rule results in a third array chunk having three compacted groups (composed of one entry) and a "fully enumerated" group (of 256 entries). In the event the second rule is deleted, the level three chunk would reduce to four "compacted" groups, and so reduce the number of used entries to four (as opposed to 259). To reduce any stalls, however, rather than delete the rule and require third array chunks to be rewritten, the preferred functional steps would replace the deleted rule with a "dummy" rule (192.9.128 (25-bit prefix)→nexthop A). In this manner, the fully enumerated group would be rewritten to have all nexthop values of A. At the same time, the level three chunk will be tagged for "rebuild." The level three chunk will then be rewritten by a "garbage collection" function described below.

Managing Data Structure

The above described update function, including both the ADD and HOPCHANGE functions, result in the depletion of available unused memory at the end of each array. To reduce the chance that routing functions will be suspended when memory gets depleted, the data structure can be managed with a "garbage collection" function. As in the case of the update function, in the preferred embodiment, the garbage collection is accomplished by a method running on a general purpose processor.

The preferred garbage collection approach is intended to be a continuously running "background" task that performs its functions when a lookup engine is idle. In this manner, the garbage collection function will not unduly interfere with routing operations. The particular garbage collection function described herein seeks to consolidate free memory in a single contiguous region in both the second and third arrays. Addresses to the second and third arrays are allowed to "wrap around." Thus, unused portions at the top and bottom of an array will form a single contiguous region.

Referring now to FIG. 22, a garbage collecting method is set forth in pseudocode form. The method can continue to run while the second and third arrays have unused areas that are not contiguous (line 1). The method can then examine the first chunk within the second array (L2Chunk) that is situated after the upper limit (M2_free_top) of the contiguous unused portion of the second array. Initially, the second array chunk is examined to see if it is tagged for deletion. If so, it is incorporated into the contiguous unsed portion by increasing the upper limit of the unused portion (line 3).

The second level chunk is then examined to see if it is tagged for "rebuild" (line 4). Such a tag may be indicated for the second level chunk by the update method described above. Intially, any third array chunks associated with a rebuilt second array chunk are rebuilt. These third array chunks are then stored so as to start at the beginning (M3_free_bottom) of the contiguous unused portion of the third array. In a similar fashion, the second array chunk is then rebuilt and placed at the beginning of the second array contiguous unused portion (M2_free_bottom) (lines 5 and 6). With the second and third array chunks now at new locations, pointers to these chunks are revised. Because the particular method of FIG. 22 corresponds to the data structure illustrated by FIGS. 2–5, this step involves storing a first portion of a third array base address (Base3k) and a second array pointer (L2BaseDivTwo) in the corresponding first array entry (M1) (line 7). The now outdated third array chunks are tagged for deletion, and the now outdated second array chunk is incorporated into the used contiguous portion second array by increasing the upper limit of the contiguous portion (lines 8 and 9).

The method continues on to a third case, in which unused portions exist, that are separated from the contiguous unused portion. In such a case, the second array chunk situated above the upper limit of the contiguous unused portion is copied to the bottom of the contiguous unused portion (line 11) and the first array pointer entry changed to point to the new second array chunk address (i.e, the newly made copy) (line 12). Finally, the now outdated second array chunk is incorporated into the contiguous portion by increasing the upper limit of the contiguous portion by the size of the outdated second array chunk (line 13). In this manner, during idle cycles, the contiguous unsed second array portion is essentially shifted upward, to eventually incorporate non-contiguous unused portions.

Having shifted the second array chunks, the preferred method of FIG. 22 then shifts the third array chunks. In a similar fashion to line 2, the first chunk of the third array (L3Chunk) situated after the upper limit (M3_free_top) of the contiguous unused third array portion is examined (line 15). If the third array chunk is tagged for deletion, it is incorporated into the contiguous unsed portion of the third array by increasing the upper limit of the third array continguous portion. If the third array chunk is not tagged for deletion, it is shifted in the same general fashion as the second array chunk described above.

The third array chunk is copied to the bottom of the contiguous unused portion and the corresponding pointer entry within the second array is changed to point to the new third array chunk address. Finally, the now outdated third array chunk is incorporated into the contiguous portion by increasing the upper limit of the unused contiguous portion (lines 17–20).

Figure 23A:
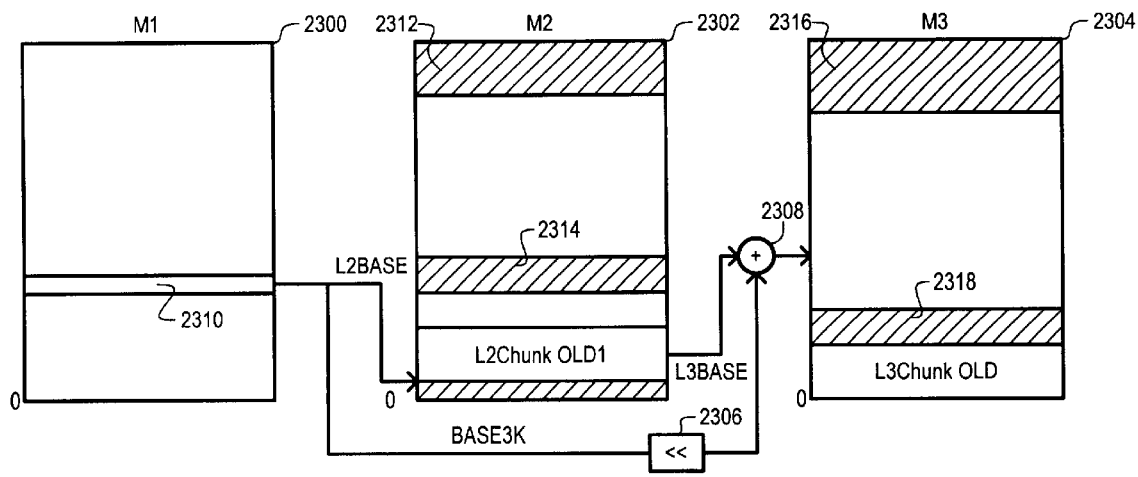
FIGS. 23A–23C are block diagrams illustrating a data structure management function according to a preferred embodiment.
Figure 23B:
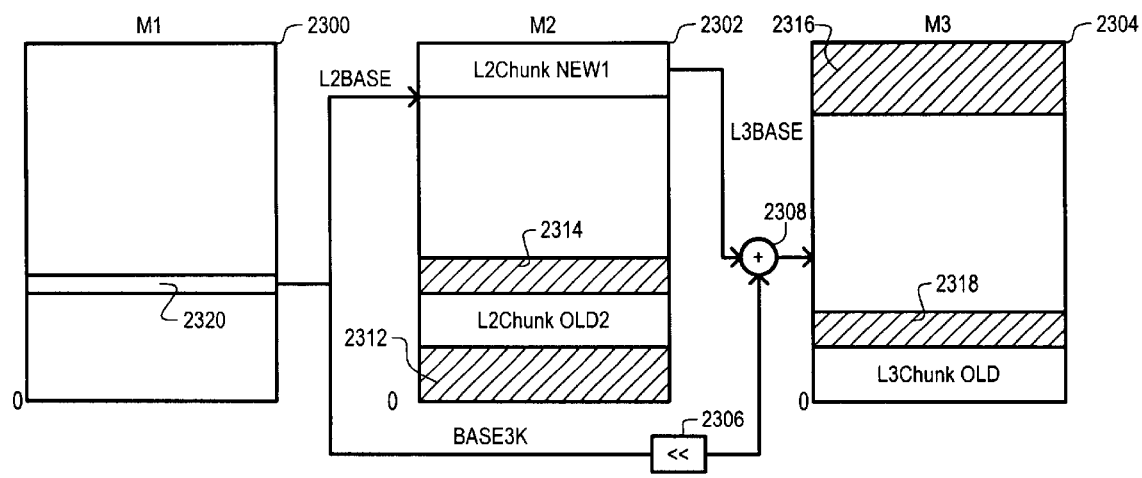
Figure 23C:
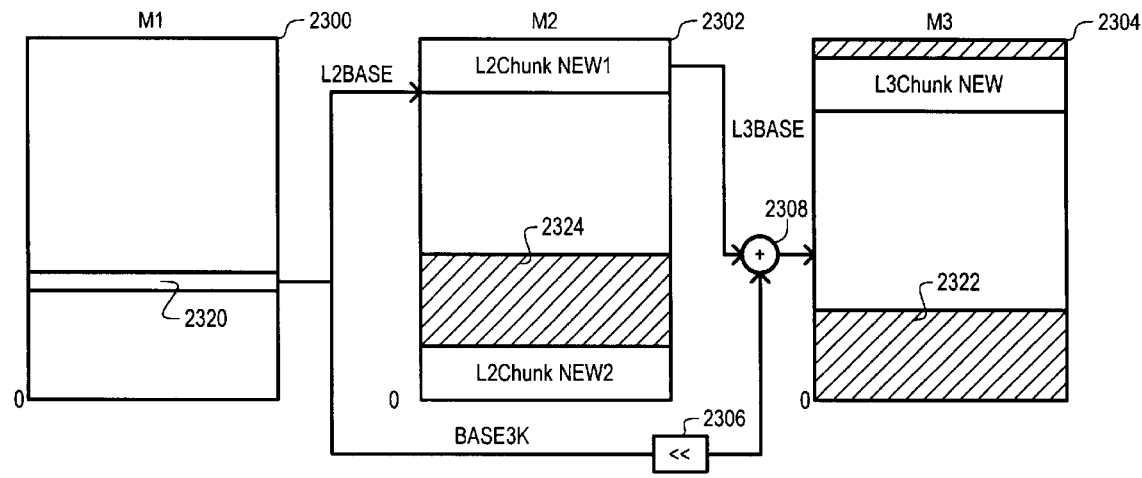

To better understand the garbage collecting functions described by FIG. 22, a series of diagrams are set forth in FIGS. 23A–23C. The diagrams are similar to those of FIGS. 21A–21C, and include a first, second and third array (2300, 2302 and 2304), a shift circuit 2306, and an adder circuit 2208. FIG. 23A illustrates the data structure prior to a garbage collecting function. The first array 2300 includes a second array pointer entry 2310 that provides a second array base address (L2BASE) and a portion of a third array base address (BASE3K). The second array 2302 is shown to include a second array chunk (L2Chunk OLD1), a contiguous unused portion 2312, and a non-contiguous unused portion 2314. The L2Chunk OLD1 is the chunk that is adjacent to the unused contiguous portion 2312. Similarly, the third array 2304 is shown to include a third level chunk (L3Chunk OLD), a contiguous unused portion 2316, and a non-contiguous unused portion 2318.

FIG. 23B illustrates the data structure during the garbage collecting operation. Within the second array 2302, L2Chunk OLD1 has been copied to the bottom of contiguous portion 2312, to create L2Chunk NEW1. The limits of the contiguous portion 2312 are increased, resulting in the different second array chunk (L2Chunk OLD2) being the chunk that is adjacent to the top of the contiguous unused portion 2312. The second array pointer entry within the first array 2300 is updated to point to L2Chunk NEW1 to create a modified pointer entry 2320.

FIG. 23C illustrates the data structure at the conclusion of the garbage collecting function. Within the third array 2304, L3Chunk OLD has been copied to the bottom of contiguous portion 2318, to create L3Chunk NEW. The limits of the contiguous portion 2318 are increased, resulting in the third array contiguous portion and non-contiguous portion being merged into a single contiguous portion 2322. Similarly, within the second array 2302, L2Chunk OLD2 has been copied to the bottom of contiguous portion 2312, to create L2Chunk NEW2. The limits of the contiguous portion are increased, and the second array contiguous and non-contiguous portions are merged into a single contiguous portion 2324. In this manner, non-contiguous unused portions within the first and second arrays can be incorporated into a single contiguous portion, resulting in a data structure that can be rapidly updated.

Unlike methods of the prior art, which recompile an entire data structure when table updates are needed, the preferred embodiment can incrementally update the routing data structure, with no stalls in the lookup function for most cases. In those cases where stalls are required, they are very short, in the order of a few tens of nanoseconds, to write a single word to the data structure. Though several such write steps may be required to execute a table update, lookups may proceed after each such write step. Thus, the preferred embodiment update approach can advantageously provide concurrent update performance, improving throughput and requiring less buffering.

The various embodiments described above have referred to "nexthop values" in general, and in some instances, 15-bit nexthop value in particular. It is understood that such a value is not necessarily an actual 15-bit value that identifies a port or forwarding location. For example, many such port identifying indicia may require 16-bits or more. In such a case, the nexthop value of the various embodiments would represent an index to an output value having a larger number of bits. As just one particular example, the 15-bit nexthop values of data structure set forth in FIGS. 2–5 could be used as an index to a table having $2^{15}$ entries, each of which contains a 16-bit port identifier. Or, as another example, using wider memory devices in place of 116, 118 and 120, or multiple clock cycles per memory access, a nexthop value of 31 bits, 63 bits, or other width could be returned in response to a query.

The hardware optimized embodiments described in FIGS. 1–10 and 17 may be particularly suited for use as a component in a high-speed router. As just one example, the hardware optimized look-up engines described could be implemented as a lookup controller integrated circuit ("IC"). Such a lookup controller IC could be integrated into existing router forwarding chip sets to provide improved performance. Such an implementation would require only a relatively modest amount of memory, in contrast to other prior art approaches.

For SRAM implementations, due to current memory densities, embodiments that handle 128K routes (rules), may provide a practical limitation for one controller. However, it is understood that very large routing tables could be split among multiple preferred embodiment systems. In this manner, the preferred embodiment architectures can be scaled up to handle a very large number of routes.

While the various embodiments have described applications that lookup a 32-bit destination address, the teachings set forth herein can be applied to other types of search functions. For example, some types of routers may forward a packet to a destination according to criteria in addition to a destination address. Such applications require "multiple field" lookups. For example, networks may include access control lists and policy-based routing that forward packets (or perhaps do not forward packets) according to additional header information. Such applications will have to perform a lookup for the destination address, and in addition, perform one or more additional lookups on other fields within the header. Other applications for multiple field lookups that may benefit from the present invention include network flow classification and network traffic accounting. Furthermore, the manner by which packets may be forwarded may require multiple field lookups. Such applications include quality of service (QOS) and class of service (COS) network features.

The basic system architectures set forth herein can be expanded to handle such multiple field lookups. Multiple systems can be cascaded, resulting in a multiple field lookup that occurs at the same speed as a single 32-bit lookup operation. Accordingly, one skilled in the art would recognize that while the preferred embodiments set forth herein have been described in detail, it is be understood that the present invention could be subject various changes, substitutions, and alterations without departing from the spirit and scope of the invention. Accordingly, the present invention is intended to be limited only as defined by the appended claims.

What is claimed is:

1. A system, comprising:
    a splitter that separates an input value into at least first, second, and third portions;
    a first memory addressable by the first portion of the input value and configured to output either first directly encoded output information or first pointer information;
    a first address generator configured to generate a first output address from the second portion of the input value and the first pointer information;
    a second memory addressable by the first output address and configured to output either second directly encoded output information or second pointer information;
    a second address generator configured to generate a second output address from the third portion of the input value, the first pointer information, and the second pointer information; and
    a third memory addressable by the second output address and configured to output third directly encoded output information,
    wherein the first pointer information includes first encoded information, first base address information, and second base address information.

2. The system of claim 1, wherein the first address generator is configured to:
    generate a first offset value from the first encoded information and the second portion of the input value, and
    combine the first offset value and the first base address information to generate the first output address.

3. The system of claim 1, wherein the second pointer information includes second encoded information and third base address information.

4. The system of claim 3, wherein the second address generator is configured to:
    generate a second base address from the second base address information and the third base address information,
    generate a second offset value from the second encoded information and the third portion of the input value, and
    combine the second offset value and the second base address to generate the second output address.

5. A system, comprising:
    a splitter that separates an input value into at least first, second, and third portions;
    a first memory addressable by the first portion of the input value and configured to output either first directly encoded output information or first pointer information;
    a first address generator configured to generate a first output address from the second portion of the input value and the first pointer information;
    a second memory addressable by the first output address and configured to output either second directly encoded output information or second pointer information;
    a second address generator configured to generate a second output address from the third portion of the input value, the first pointer information, and the second pointer information; and
    a third memory addressable by the second output address and configured to output third directly encoded output information, wherein the first directly encoded output information includes two directly encoded output values, the system further comprising:
 a selector connected to the first memory and configured to select between the two directly encoded output values.

6. A method, comprising:

splitting input information into at least level 1 (L1) information and level 2 (L2) information;

obtaining an L2 base address and coded information from a first memory using the L1 information;

combining the L2 base address, the coded information, and the L2 information to obtain a second address; and reading either first output information or level 3 (L3) lookup information from a second memory using the second address, wherein the splitting further includes:
 splitting the input information into level 3 (L3) information, and wherein the obtaining further includes:
  obtaining L3 base address information from the first memory using the L1 information.

7. A method, comprising:

splitting input information into at least level 1 (L1) information and level 2 (L2) information;

obtaining an L2 base address and coded information from a first memory using the L1 information;

combining the L2 base address, the coded information, and the L2 information to obtain a second address;

reading either first output information or level 3 (L3) lookup information from a second memory using the second address;

combining the L3 information, the L3 lookup information from the second memory, and the L3 base address information from the first memory to obtain a third address; and reading second output information from a third memory using the third address.

* * * * *